United States Patent [19]
Aldrich et al.

[11] 4,164,895
[45] Aug. 21, 1979

[54] MODE INDICATION SYSTEM

[75] Inventors: Howard P. Aldrich, Rancho Palos Verdes; Glenn A. Burgess, Downey; Clarence T. Yamanaka, Carson, all of Calif.

[73] Assignee: The Garrett Corporation, Los Angeles, Calif.

[21] Appl. No.: 806,112

[22] Filed: Jun. 13, 1977

[51] Int. Cl.² .................................................. B64D 13/00
[52] U.S. Cl. ............................................................ 98/1.5
[58] Field of Search ............................ 98/1.5; 244/5–9, 244/118 P; 137/81; 236/49; 165/15

[56] References Cited
U.S. PATENT DOCUMENTS

| | | | |
|---|---|---|---|
| 2,851,254 | 9/1958 | Messinger et al. | 244/59 |
| 2,966,109 | 12/1960 | Best | 98/1.5 |
| 3,192,848 | 7/1965 | Townsend | 98/1.5 |
| 3,215,057 | 11/1965 | Turek | 98/1.5 |
| 3,461,790 | 8/1969 | Kinsell et al. | 98/1.5 |
| 3,473,460 | 10/1969 | Emmons | 98/1.5 |
| 3,711,044 | 1/1973 | Matulich | 98/1.5 |

Primary Examiner—Henry C. Yuen
Attorney, Agent, or Firm—Frank J. Kowalski; Joel D. Talcott; Albert J. Miller

[57] ABSTRACT

A cabin pressure control system has two independent controllers, one of which is the primary controller and the other the standby controller taking control in case of primary controller malfunction. The controllers switch roles automatically each flight. An annunciating system indicates the identity of the primary controller on the previous flight and maintains the designation in case of malfunction so that a defective unit may be readily identified.

5 Claims, 15 Drawing Figures

MODE INDICATION SYSTEM

BACKGROUND OF THE INVENTION

(1) Field of the Invention

In modern aircraft, cruising elevations of 35,000 ft. or greater are not uncommon. While the atmospheric pressure outside the aircraft becomes very low at such altitude, it is required that the pressure inside the aircraft cabin remain as near sea level pressure as possible to provide adequate oxygen for the passengers. However, if cabin pressure is not permitted to decrease, the pressure difference between inside cabin pressure and outside ambient pressure can become sufficiently great at high altitude to cause a catastrophic rupturing of the aircraft. Accordingly, it has been standard practice to permit cabin pressure to decrease to a value corresponding to an altitude of about 8,000 ft. Thus, structural integrity of the aircraft can be maintained while providing adequate oxygen for passenger breathing.

This variation in cabin pressure must be accomplished without sacrificing passenger comfort. Since the human ear is more sensitive to increases in pressure (descent in elevation) than to decreases in pressure (ascent in elevation), the passenger comfort factor is complicated by the need for different permissible maximum change rates, for use in each phase of operation. Furthermore, for maximum passenger comfort the cabin pressure should not be subject to pressure spikes or changes when the aircraft momentarily climbs or drops in altitude.

(2) Prior art

The importance of cabin pressure control when viewed in light of passenger comfort and safety has imposed a great burden on the flight crew work load. This burden is ever increasing while the present tendency is to reduce the size of the flight crew. For these reasons, methods of automatic cabin pressure control have been developed which require minimum work by the flight crew. However, these prior art automatic cabin pressure control systems are known to have significant deficiencies. Although flight crew work load is greatly reduced, the attention of one member of the flight crew periodically must be focused on the cabin altimeter to clock the rate of cabin pressure change or to compare it with the aircraft altimeter to be assured that the single automatic cabin pressure controller is functioning properly. Also, automatic controllers in general will compute a rate of cabin pressure change which is a function of the differential between existing cabin pressure and its final value or the existing aircraft altitude and its final value. Previously chosen references upon which the rate of cabin pressure was based resulted in a rate of change which was subject to instantaeous rapid changes when the aircraft altitude would change rapidly due to air pockets or foul weather. Examples of this prior type of automatic cabin pressure controller are found in U.S. Pat. No. 3,473,460 to F. R. Emmons and U.S. Pat. No. 3,461,790 to R. C. Kinsell.

SUMMARY OF THE INVENTION

The present invention obviates these and other deficiencies of prior art control systems. The continual or intermittent observation of the cabin altimeter is eliminated by the use of dual automatic controllers. One controller is designated "primary" and performs the cabin pressure control functions while the other controller is designated "standby" and monitors the performance of the primary controller. The controllers are continually and automatically monitored to detect whether both controllers are either simultaneously on or simultaneously off and a system is incorporated to prevent such a situation. The standby controller monitors the actual rate of change of cabin pressure and compares it with a preselected rate of change limit. If the actual rate of change of cabin pressure substantially exceeds the preselected rate of change limit, a switchover signal is initiated and the standby controller shuts off the primary controller and takes command of the cabin pressure control. This switch-over, however, is blocked if the excess rate of change is caused by insufficient air inflow rather than a controller defect. Automatic transfer of control from primary to standby is also blocked when the excess rate of cabin pressure change is due to the pilot causing the aircraft to climb at a rate greater than that upon which the preselected cabin pressure change rate was based. Simultaneously, the preselected rate of change is incremented by a predetermined amount to permit a more rapid climb in cabin altitude and thereby maintain a safe differential pressure between outside ambient pressure and inside cabin pressure.

The primary and standby controllers are completely identical and therefore interchangeable and they actually alternate roles on successive flights so that the cabin pressure control capability of each unit can be regularly verified. Each controller has a light which when on, indicates to the controller that it is the primary for that flight. If control should be switched from primary to standby due to a detected malfunction of the primary controller, or its associated selector or drive motor, the automatic successive flight switching function will be blocked so that the light on the primary controller for the last flight remains illuminated. This enables the maintenance crew to readily determine which of the identical controllers or associated components requires repair.

The present invention obviates the second enumerated prior art deficiency by controlling the cabin pressure as a function of sensed atmospheric pressure only. The cabin pressure approximately follows the curve $$Pc = \frac{a}{1 + b/P_a}$$

where $P_c$ is the cabin absolute pressure, $P_a$ is the ambient atmosphere absolute pressure and a and b are constants. This relation is independent of aircraft cruising altitude. By proper selection of the constants a and b, an essentially linear function is produced. This function permits $P_c$ to track $P_a$, reaching their permitted minimum values together, but still prevents $P_c$ from being extremely sensitive to minor rapid changes in $P_a$.

DESCRIPTION OF THE PREFERRED EMBODIMENT

Figure 1:
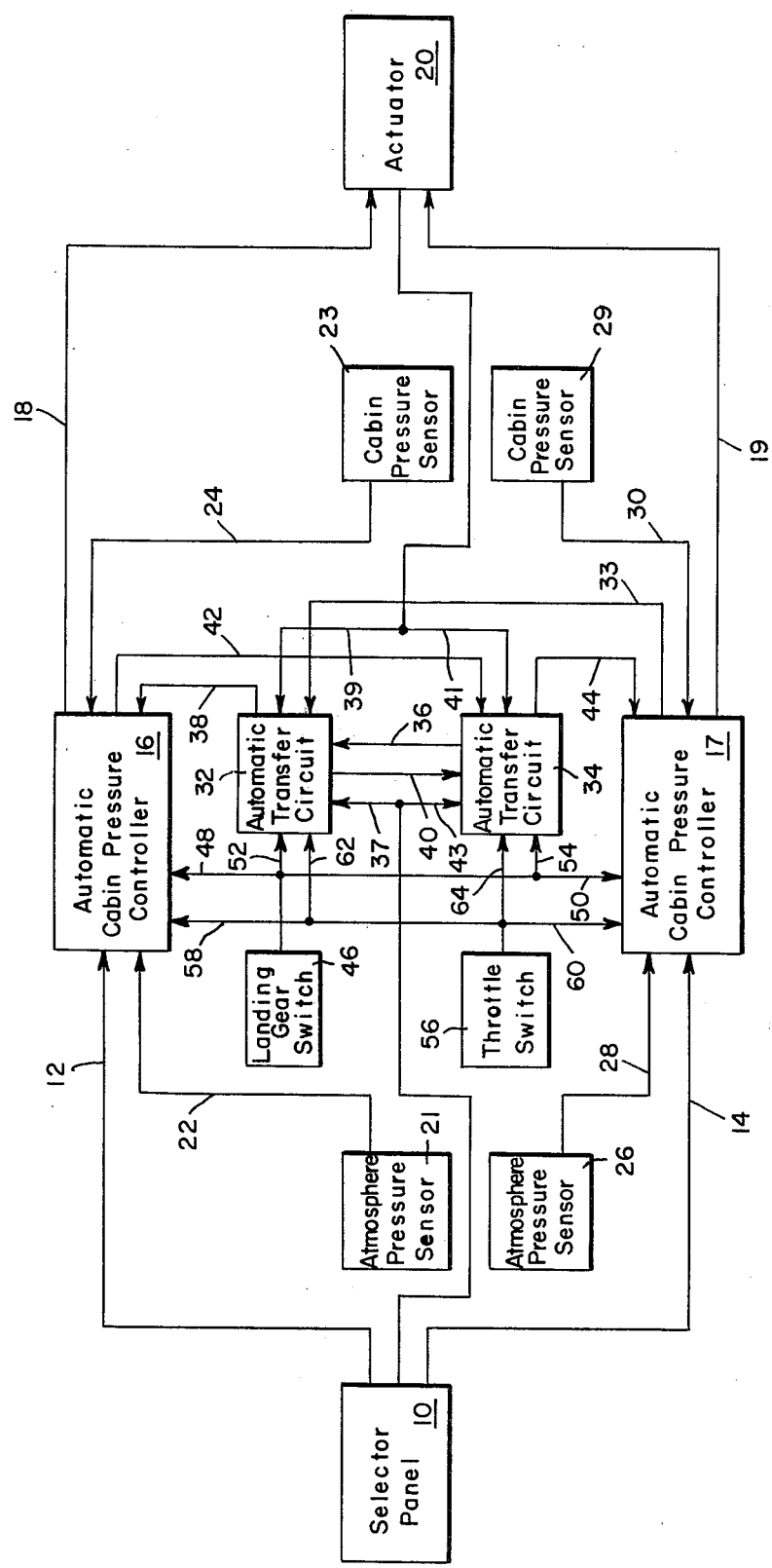
FIG. 1 is a block diagram of a dual automatic cabin pressure control system of this invention.
Figure 12:
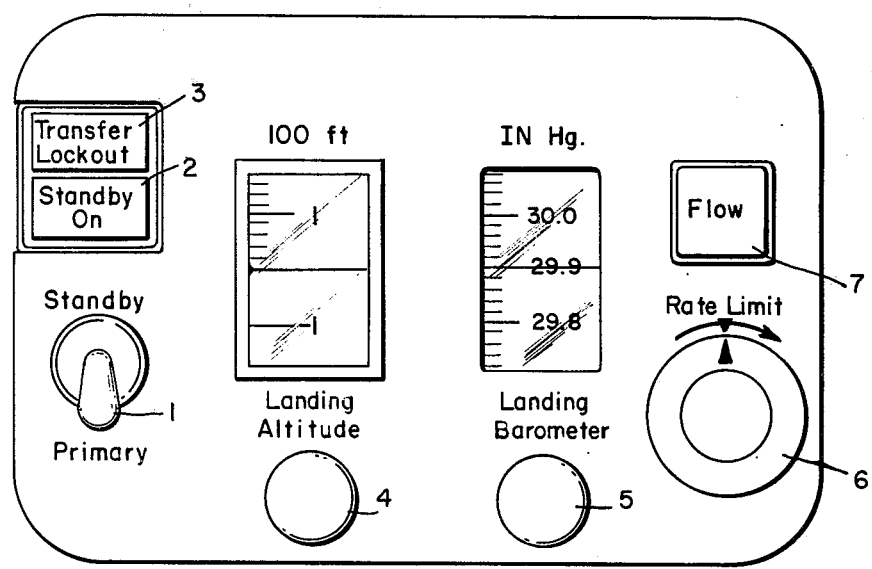
FIG. 12 is a plan view of a cabin pressure selector panel suitable for the system of the present invention.

FIG. 1 illustrates a dual automatic cabin pressure control system embodying the present invention. A selector panel 10 (see also FIG. 12) is manually controlled to produce output voltages corresponding to the landing altitude, set by a selector knob 4, landing field barometric pressure correction, set by a selector knob 5 and a selected limit of the rate of cabin pressure change, set by a selector knob 6. These voltages are transmitted through conductors 12 and 14 to identical automatic cabin pressure controllers 16 and 17, respectively.

The cabin pressure selector 10 may include dual sets of selector potentiometers driven by the selector knobs 4, 5, and 6, one for cabin pressure controller 16 and one for cabin pressure controller 17. These dual sets of potentiometers would preferably be ganged together so that the command voltages for both controllers are the same. Controllers 16 and 17 are connected through conductors 18 and 19, respectively, to an actuator 20 which controls opening and closing of an outflow valve (not shown).

Each of the controllers 16 and 17 preferably operates a separate outflow valve motor in the actuator 20 with only the mechanical valve linkage and reduction gears in common. Each controller has its own power supply, sensor units, electronic logic and control circuits (illustrated in FIG. 2) so that they operate completely independent of each other, minimizing the possibility that both controllers could be disabled at the same time.

Controller 16 receives an input voltage proportional to ambient atmospheric pressure from an atmosphere pressure sensor 21 through conductor 22 and an input voltage proportional to cabin pressure from a cabin pressure sensor 23 through conductor 24. Controller 17 receives corresponding input voltages from an atmosphere pressure sensor 26 through conductor 28 and from cabin pressure sensor 29 through conductor 30. Pressure sensors 21, 23, 26 and 29 may be any suitable pressure transducers which produce a detectable change in output responsive to changes in pressure. An automatic transfer circuit 32 receives inputs from automatic cabin pressure controller 17 through conductor 33, from automatic transfer circuit 34 through conductor 36 and from selector panel 10 through conductor 37. Automatic transfer circuit 32 is also connected to automatic cabin pressure controller 16 through operation of a relay (illustrated schematically as conductor 38), to actuator 20 through conductor 39 and to automatic transfer circuit 34 through conductor 40. Automatic transfer circuit 34 receives an input from actuator 20 through conductor 41, from automatic cabin pressure controller 16 through conductor 42, and from selector panel 10 through conductor 43 and sends an input to automatic cabin pressure controller 17 through operation of a relay (illustrated schematically as conductor 44).

Each automatic transfer circuit is associated with and controls one of the automatic cabin pressure controllers. Automatic transfer circuit 32 is associated with automatic cabin pressure controller 16 and automatic transfer circuit 34 is associated with automatic cabin pressure controller 17. Automatic cabin pressure controllers 16 and 17 and automatic transfer circuits 32 and 34 also receive inputs from a landing gear switch 46 through conductors 48, 50, 52 and 54, respectively, and from a throttle switch 56 through conductors 58, 60, 62 and 64, respectively, the purposes for which will be subsequently described in detail.

During each flight, on an alternating basis, one controller functions as the primary controller and the other serves as the standby controller. The primary controller is in actual control of the cabin pressure throughout the flight. In the course of the flight, the standby controller monitors the performance of the primary controller. If the primary controller should malfunction, the standby controller will take over control of cabin pressure. If no malfunction occurs, identity of the primary controller is transferred upon landing for the next flight. This automatic transfer of the primary mode between controllers on successive flights enables each controller of the dual automatic control system to automatically check the other on a regular basis to provide maximum reliability for the entire system. Each of the cabin pressure controllers utilizes the input voltages from its corresponding atmosphere pressure sensors to compute a desired corresponding cabin pressure. This is compared to the voltage corresponding to cabin pressure from the cabin pressure sensor to generate an error signal utilized by the primary controller to control the position of the actuator 20.

Figure 2:
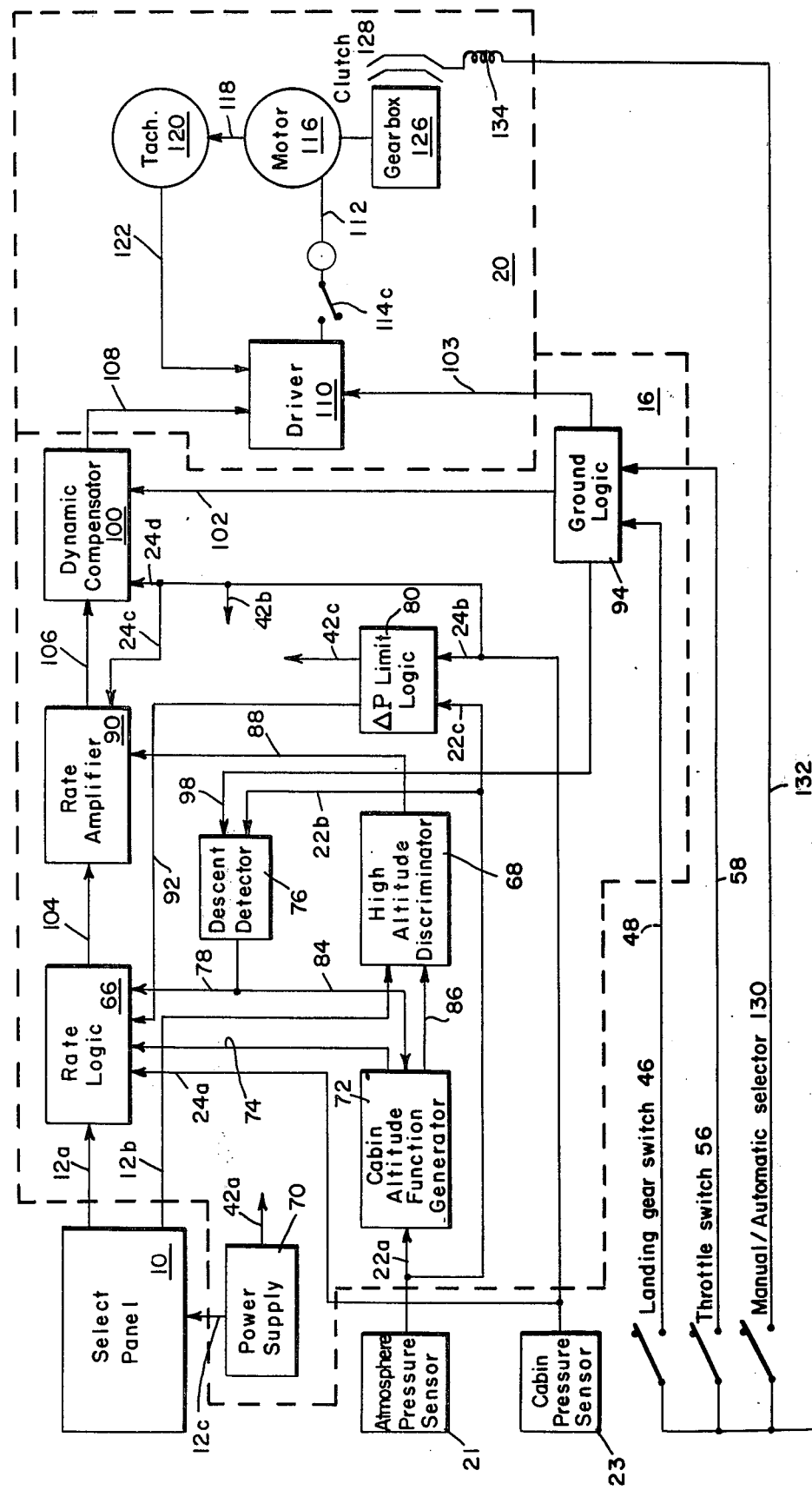
FIG. 2 is a block diagram of one of the dual automatic controllers of FIG. 1.

Referring now to FIG. 2, the automatic cabin pressure controller 16 and associated components are illustrated in detail, it being understood that controller 17 (FIG. 1) has an identical set of components similarly connected.

The conductor 12 connecting the selector panel 10 to the controller 16 comprises a conductor 12a which connects the potentionmeter of the "rate limit" selector 6 of the selector panel (FIG. 12) to a rate logic circuit 66 of the controller. A conductor 12b connects selectors 4 and 5 for landing field altitude and barometric pressure of the selector panel 10 to a high altitude discriminator circuit 68. A conductor 12c connects the selector panel 10 to a power supply 70 in the controller 16 which provides operating voltage for the selector panel 10. The power supply 70 is also connected by a conductor 42a to a power loss detector circuit which will be subsequently described in connection with FIG. 9.

The rate logic circuit 66 receives additional input from a cabin altitude function generator 72 through a conductor 74, from a descent detector circuit 76 through a conductor 78, and from the cabin pressure sensor 23 through a conductor 24a. The cabin pressure sensor 23 also provides its voltage signal through a conductor 24b to a ΔP limit logic circuit 80. This signal is also conveyed by a conductor 24c to a rate amplifier 90 and by a conductor 42b to a malfunction detection logic circuit which will be described in connection with FIG. 9, and to dynamic compensator 100 by conductor 24d.

Connection of the atmosphere pressure sensor 21 to the controller 16 is by a conductor 22a to the cabin altitude function generator 72, via a conductor 22b to the descent detector 76, and by a conductor 22c to the ΔP limit logic circuit 80. The cabin altitude function generator 72 is also connected by a conductor 84 to the descent detector 76 and by a conductor 86 to the high altitude discriminator 68 which is in turn connected by a conductor 88 to the rate amplifier circuit 90. The ΔP limit logic circuit 80 is also connected to the rate logic circuit 66 by a conductor 92 and connected by a conductor 42c to the malfunction detection logic circuit of FIG. 9.

A ground logic circuit 94 in the controller 16 receives a DC input signal from a source of direct current voltage 96 by parallel paths through the landing gear switch 46 via conductor 48 and through the throttle switch 56 via conductor 58. Output from the ground logic circuit 94 is provided to the descent detector circuit 76 through conductor 98 then to a dynamic compensator circuit 100 through a conductor 102, and to driver 110 through conductor 103.

The output produced by the rate logic circuit 66 is transmitted through conductor 104 to the rate amplifier 90 which produces a corresponding output which is transmitted to the dynamic compensator 100 via conductor 106. The resulting controller output is transmitted from the dynamic compensator 100 through the conductor 108 to a driver circuit 110 of the actuator 20. The driver circuit 110 is connected in a feedback loop comprising conductor 112, contact 114c of switch 114 (see FIG. 8), motor 116, conductor 118, tachometer 120, and conductor 122 for controlling operation of the motor 116. Operation of the motor 116 controls operation of the outflow valve (not shown) to which it is coupled through a gearbox 126 and magnetic clutch 128. The clutch 128 is selectively controlled between its engaged and disengaged positions by a direct current voltage which is supplied from the DC source 96 through a manual/automatic selector switch 130 and conductor 132 to the actuating winding 134 of the clutch.

The position of contact 114c determines whether the controller is in actual control of the cabin pressure rate of change. The entire controller is functioning whether it is operating in the primary or standby mode. The difference is that when the controller is primary and no malfunction has been detected, it will be in control of the cabin pressure change rate due to its contact 114c being closed. The standby controller will be functioning but not controlling the cabin pressure because its corresponding switch is open. When a malfunction is detected or the standby controller is selected manually, the controller will control the cabin pressure even though it is operating in the standby mode.

In operation, the automatic cabin pressure controller 16 utilizes manually selected inputs from the selector panel 10 and inputs corresponding to ambient atmospheric pressure and cabin pressure from the sensors 21 and 23, respectively, to produce an output voltage for controlling position of the outflow valve (not shown).

The cabin altitude function generator 72, which will be subsequently described in detail in connection with FIG. 5, receives an input voltage from the atmospheric pressure sensor 21 through conductor 22a which is proportional to ambient atmospheric pressure outside the airplane and utilizes this voltage to compute an output voltage corresponding to a calculated value of cabin pressure. The functional relationship established by the cabin altitude function generator 72 automatically provides a corresponding cabin altitude for every possible aircraft altitude so that no manual selection of cruise altitude by the crew is necessary to effect a proper rate of cabin pressure change, it being understood that the maximum permissible cabin altitude (generally 8,000 ft.) is established at the maximum design altitude for the airplane. This output voltage is altered during descent by a positive DC voltage from descent detector 76.

The descent detector 76 receives the ambient pressure responsive voltage from the atmosphere pressure sensor 21 through conductor 22b and utilizes this voltage to determine when the airplane has begun its final descent in preparation for landing. In the preferred embodiment, this is determined to be when the airplane has descended at a rate of at least 1,000 ft. per minute for a period of one minute. When such has been determined, the descent detector 76 transmits an output voltage to the rate logic 66 through conductor 78, which causes the output to be at full value. This output will be maintained at this level regardless of subsequent changes in the airplane's mode of flight until the airplane has landed, whereupon the ground logic circuit 94 will transmit a resetting signal through conductor 98 to the descent detector 76 in response to closing of the landing gear switch 46.

The positive output voltage of cabin altitude function generator 72 is transmitted through conductor 74 to the rate logic 66 wherein it is added to a negative input voltage proportional to actual cabin pressure, which voltage is received from cabin pressure sensor 23 through conductor 24a. The result of this addition indicates whether the aircraft is ascending or whether it is in the dwell function. If the difference between the actual cabin pressure and the commanded cabin pressure is great, the aircraft is ascending; if the difference is small the aircraft is in the dwell function. Accordingly, if the output of the cabin altitude function generator 72 is sufficiently greater than the output of the cabin pressure sensor 23 so as to indicate that the airplane is in a scheduled climb, the rate logic will produce an output through the conductor 104 which is at a first predetermined level, preferably 100% of the input voltage from conductor 12a. If less than this predetermined difference exists, the rate limit will be scaled to lesser value, preferably about 50% of the rate limit input. The rate logic 66 is able to determine whether or not the aircraft is descending through a signal from descent detector 76 through conductor 78 which is true when the aircraft is descending and false otherwise.

From the selector panel 10, the rate logic 66 receives an input voltage through conductor 12a which corresponds to a manually selected limit of rate of cabin pressure change or "rate limit". In the preferred embodiment rate logic 66 has two possible outputs, either 100% of the input it receives from selector panel 10 or 50% of the input it receives from selector panel 10. If on the basis of the information that it receives from the sum of the actual cabin pressure and the commanded cabin pressure or from descent detector it determines that the aircraft is either ascending or descending it will pass 100% of the input value of rate limit. If rate logic 66 determines that the aircraft is in the dwell function, it will only pass 50% of the rate limit input from selector panel 10.

The output of rate logic 66 is passed to rate amplifier 90 through conductor 104 to determine at what level rate amplifier 90 will saturate. At a summing node of rate amplifier 90 the output of high altitude discriminator 68 through conductor 88 and the output of cabin pressure sensor 23 through conductor 24c are combined to supply the amplification input.

The selector panel 10 provides an output voltage through conductor 12b to the high altitude discriminator 68 which corresponds to the preselected landing field altitude, corrected for barometric pressure. Also fed to the high altitude discriminator is the output of the cabin altitude function generator 72 which is proportional to the calculated cabin altitude, i.e. the altitude to which the controller 16 should cause the aircraft cabin to reach. The high altitude discriminator 68 blocks the voltage signal corresponding to the lower of these altitudes and transmits the signal corresponding to the higher altitude to the rate amplifier 90 through conductor 88. The rate amplifier 90 compares this to the signal corresponding to actual cabin pressure received from the cabin pressure sensor 23 through conductor 24c. If comparison of these signals indicates that actual cabin pressure corresponds to an altitude lower than that transmitted by the high altitude discriminator 68, the rate amplifier 90 will not be permitted to produce a command signal calling for descent in cabin altitude.

This feature of the rate amplifier 90 is designed to operate during descent of the aircraft to a landing field having an altitude significantly greater than sea level, such as the airport at Denver or Mexico City. During descent, actual cabin pressure will be lower than the pressure indicated by the cabin altitude function generator 72, indicating that the cabin is at a higher altitude than that required. As aircraft altitude decreases, cabin altitude will decrease correspondingly. Because the maximum cabin altitude is only about 8,000 ft, it will reach the level of the landing field much before the aircraft reaches that altitude. If descent of the cabin were permitted to continue, it would then be necessary to provide an extended period of depressurization of the aircraft after it had landed. Accordingly, after the desired cabin altitude as indicated by the output of the cabin altitude function generator 72 has reached an altitude equivalent to that selected for the landing field, the high altitude discriminator 68 will prevent further descent of the cabin supplying the landing field altitude as the command altitude. When actual cabin pressure has reached a barometrically corrected value for this altitude, descent of the aircraft cabin terminates.

An additional input to the rate logic 66 is provided by ΔP limit logic circuit 80. The circuit receives inputs from the pressure sensors 21 and 23 corresponding to atmospheric pressure and cabin pressure and determines therefrom the pressure differential between inside cabin and outside ambient pressures in a manner which will be described in detail in connection with FIG. 3. If this pressure differential is greater than a predetermined value so as to potentially endanger the structural integrity of the plane, an output is produced by the ΔP limit logic circuit 80 to the rate logic 66 through conductor 92 which increments the output signal of the rate limiter by an amount proportional to the excess pressure differential between atmosphere and cabin pressure. This causes the output of the rate logic to be modified so as to change the saturation level of rate amplifier 90, regardless of the relationship of the commanded altitude to the actual altitude.

The input to rate amplifier 90 from high altitude discriminator 68 through conductor 88 is always positive. High altitude discriminator 68 receives two inputs, one from the selector panel 10 which is the landing field altitude with barometric correction and one from the cabin altitude function generator 72 through conductor 86. Both of these inputs are positive and the discriminator 68 will compare the two to determine which is the higher altitude or lowest pressure. The lowest pressure is the signal that is passed to rate amplifier 90. Cabin pressure sensor 23 always has a negative output thus a negative voltage is passed to rate amplifier 90 through conductor 24c. The summation of the positive high altitude discriminator output and the cabin pressure sensor output determines whether the aircraft is ascending or descending. If the aircraft is ascending, the output voltage of high altitude discriminator 68 which will be the commanded cabin pressure will always be lower than the actual pressure from cabin pressure sensor 23. Therefore, for the ascending function, the input to rate amplifier 90 will be negative voltage. When the aircraft is descending, the commanded cabin pressure from high altitude discriminator will be greater than the actual cabin pressure from cabin pressure sensor 23. Thus, the input voltage to rate amplifier 90 will be positive.

Whether the input voltage is positive or negative determines the ultimate saturation point for rate amplifier 90. In the preferred embodiment the saturation point for negative inputs corresponds to the input from rate logic 66, whereas for positive inputs the saturation point corresponds to 3/7th of the input from rate logic 66. The output of rate amplifier 90 is the rate command which is input to dynamic compensator 100 through conductor 106 where it is combined with the first derivative of the output of cabin pressure sensor 23.

The output of rate amplifier 90 has the reverse sign of the input. Thus, when the aircraft is ascending and the input is negative, the output signal to open the valves (which is the output of the rate amplifier 90) will be positive. When the plane is descending so that an output signal which will tend to close the valves for pressurizing the aircraft cabin is required, the output of rate amplifier 90 will be negative.

The first derivative of the cabin pressure, which is calculated by the dynamic compensator 100, will be negative when the plane is ascending since this will be a decrease in cabin pressure and it will be positive when the plane is descending since this is an increase in cabin pressure. Also input into the summing node of dynamic compensator 100 is the output of ground logic 94 through conductor 102. The output of ground logic 94 which becomes the input to dynamic compensator 100 is one of three states, it is either a positive DC, a negative DC or zero. When the aircraft is required to be prepressurized for takeoff, the voltage input to dynamic compensator 100 is positive DC to override the summation of the first derivative of cabin pressure and the output of rate amplifier 90. When the aircraft has landed and it is required that the aircraft be depressurized, the output of the ground logic 94 to compensator 100 is a negative voltage which again will override the summation of the first derivative of cabin pressure and the output of rate amplifier 90. While the aircraft is in flight the output of ground logic 94 is zero so that the summation of derivative of cabin pressure and the output of rate amplifier 90 are the determining factors for opening or closing the actuator valve. If the aircraft is ascending the output of rate amplifier 90 will be positive and the first derivative of the cabin pressure will be negative. The rate command from rate amplifier 90 is modified by the value of the first derivative to lessen it so that the rate command does not tell the valve to open as fas as if it were unmodified. If the aircraft is descending the output of rate amplifier 90 will be negative and the first derivative of cabin pressure will be positive and again the summation is merely the modification of the rate command from rate amplifier 90.

Dynamic compensator 100 takes the summation of the first derivative of cabin pressure and the rate command of rate amplifier 90, whether modified by inputs from ground logic 94 or not, and passes this signal to driver 110 through conductor 108.

Thus a cabin rate change command is transmitted from the rate amplifier 90 through conductor 106 to the dynamic compensator 100 which conditions the signal to be suitable for transmission to the driver 110. In addition, a signal is transmitted to the dynamic compensator 100 from the ground logic circuit 94 when the landing gear switch is closed indicating that the aircraft has landed to command that the outflow valve (not shown) be fully opened.

The rate command passed to the driver 110 causes this circuit to apply a voltage to the motor 116, assuming contact 114c is closed, suitable to operate the motor in a desired direction and rate of speed. Contact 114c is closed when the automatic cabin pressure controller is in control of the cabin pressure or "on". When the switch is open, the controller is deemed to be "off". Operation of the motor causes the tachometer 120 to produce a feedback signal permitting proper control of the motor by the driver.

The electromagnetic clutch 128 is engaged whenever the manual/automatic selector switch 130 is in the automatic position. When the this switch is set at manual, actuating winding 134 is de-energized so that the clutch 128 disengages and the valve is no longer controlled by the motor 116. This permits the aircraft crew to manually control the outflow valve by conventional means (not shown).

Figure 3:
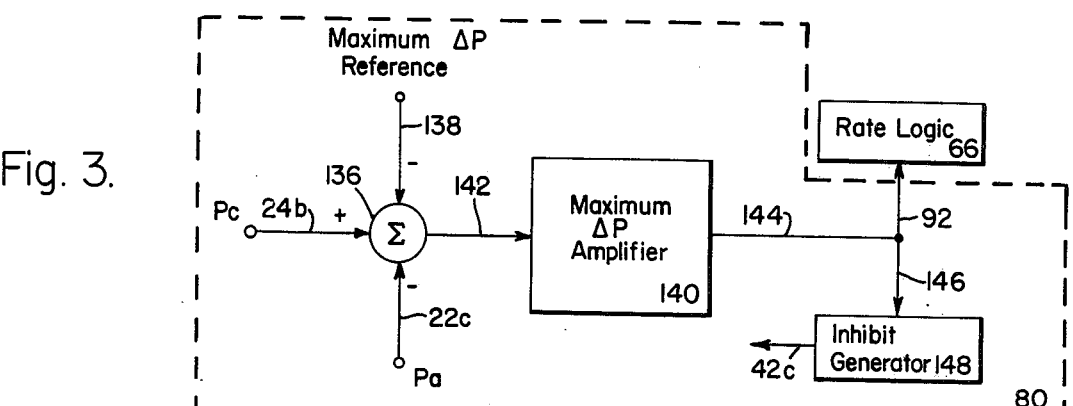
FIG. 3 is a block diagram of ΔP limit logic for use in the controller of FIG. 2.

FIG. 3 is a block diagram of $\Delta P$ limit logic 80 of FIG. 2. Summing node 136 receives a constant voltage input proportional to the maximum allowable differential between ambient atmosphere pressure and cabin pressure through conductor 138. A voltage proportional to the cabin pressure is received from cabin pressure sensor 23 through conductor 24b, and a voltage proportional to ambient atmospheric pressure is transmitted from atmosphere pressure sensor 21 to summing node 136 through conductor 22c. The output of summing node 136 is applied to a maximum $\Delta P$ amplifier 140 through conductor 142. The output of maximum $\Delta P$ amplifier 140 goes through a conductor 144 and bifurcates to conductor 92 which provides the input into rate logic 66 and to conductor 146 which provides input into an inhibit generator 148. Inhibit generator 148 then sends a signal to the automatic transfer circuit through conductor 42c which acts as a $\Delta P$ inhibit signal.

The inputs to summing node 136 from maximum $\Delta P$ reference through conductor 138 and the atmosphere pressure from the atmosphere pressure sensor 21 through conductor 22c are both negative. The input of the cabin pressure from cabin pressure sensor 23 through conductor 24b is positive.

$\Delta P$ limit logic 80 compares these two signals and if the cabin to atmosphere differential exceeds a preselected value for any reason, $\Delta P$ limit logic will increase the preselected rate limit to compensate for the increased climb rate of the aircraft.

In operation, the atmospheric pressure and cabin pressure are constantly monitored by the application to summing node 136 of voltage signals which are proportional to pressure. By subtracting the cabin pressure voltage from the atmospheric pressure voltage, it obtains a voltage proportional to the differential pressure. To this differential pressure is added a voltage proportional to the allowable $\Delta P$ so that only when the differential pressure exceeds this value will the limit logic supply an increment. The excess differential pressure is than amplified to produce an incremental increase in cabin pressure change rate. This is applied to the rate logic 66 to increment the rate as previously described.

While $\Delta P$ limit logic 80 is overriding the selected rate limit, it also prevents automatic transfer to the standby controller by issuing a "true" logic signal to the automatic transfer logic of the other controller by conductor 42c, the effect of which will be later explained.

It will be noted that in the preferred embodiment maximum $\Delta P$ amplifier 140 is reverse biased when a negative voltage is applied to the input through conductor 142. Since the ambient atmosphere pressure $P_a$ will always be less than or equal to cabin pressure $P_c$, a positive voltage will appear at conductor 142 and forward bias the amplifier. However, an output at conductor 144 from maximum $\Delta P$ amplifier 140 is not desired until the differential between the cabin pressure and the atmosphere pressure exceeds a predetermined level. By the introduction of a negative maximum $\Delta P$ voltage through conductor 138 into summing node 136, a positive voltage will not appear at conductor 142 until $P_c$ exceeds the summation of the negative maximum $\Delta P$ reference voltage and the atmosphere pressure voltage.

Figure 4:
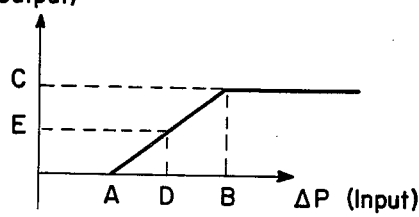
FIG. 4 is a graph of rate increment vs. differential pressure for a maximum ΔP amplifier of FIG. 3.

The result can be seen on FIG. 4. The output remains at zero until the input reaches the value designated as A, at which point, $P_c$ is greater than maximum $\Delta P$ reference plus $P_a$ and a positive voltage appears at conductor 142 and forward biases maximum $\Delta P$ amplifier 140. Maximum $\Delta P$ amplifier 140 is preferably a linear amplifier and produces an output through conductor 144 that increases linearly until it reaches a value designated as C. The output of the amplifier 140 is applied to inhibit generator 148 which informs the automatic transfer circuit that the detected difference from scheduled cabin pressure is not due to controller malfunction. This inhibits tranfer. The signal is also applied to the rate logic 66 of controller 16 which increments the rate signal by an amount proportional to the output of the maximum $\Delta P$ amplifier 140.

If the input, for example, is a voltage equal to that shown as D on the graph, the output will correspond to the value noted as E. The output of rate logic 66 will be incremented by the voltae represented by E. C on the output axis is the value where maximum $\Delta P$ amplifier 140 saturates and the output corresponds to an input of B from summing node 136. As the sum of the cabin pressure voltage, the atmospheric pressure voltage and the maximum $\Delta P$ reference voltage exceeds value B, amplification will no longer take place.

In the preferred embodiment, C on the graph would correspond to a voltage proportional to a rate increment of 800 ft. per minute. Therefore the rate, although incremented above the selected rate limit, will never exceed the selected rate limit plus 800 feet per minute.

It should be noted that the preferred embodiment ΔP limit logic 80 is used in conjunction with a dual automatic cabin pressure controller. However, the ΔP limit logic 80 can be used with a single automatic controller system wherein the maximum ΔP amplifier 140 will only increment the rate of the automatic controller and not pass a signal to inhibit generator or in the alternative will pass a signal to an inhibit generator which will prevent an error occurring on annunciator panel which may be used in conjunction with the single automatic controller system.

Figure 5:
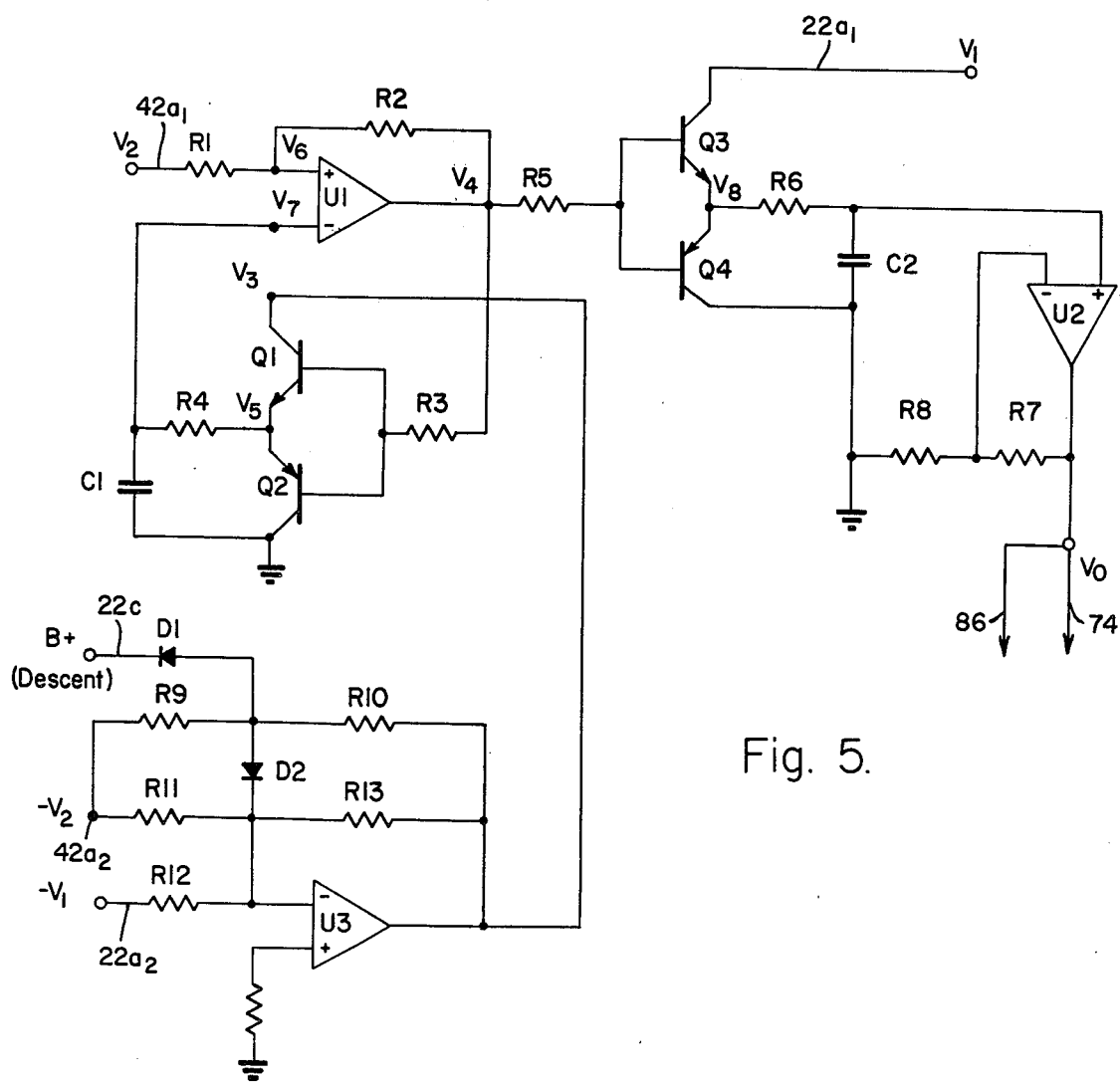
FIG. 5 is a schematic diagram of a cabin altitude function generator for the controller of FIG. 2.

Referring now to FIG. 5, cabin altitude function generator 72 consists primarily of three amplifiers U1, U2 and U3 and two sets of common emitter connected transistors, transistor Q1 connected with transistor Q2 and transistor Q3 connected with transistor Q4.

The input for a positive output at amplifier U1 is voltage $V_6$ which is the sum of $V_2$ through resistor R1 and the voltage feedback from the output of amplifier U1 through resistor R2. The input for a negative output of amplifier U1 is voltage $V_7$ which is the voltage produced by the feedback loop consisting of a common emitter connected transistors Q1 and Q2.

The output of amplifier U1 is voltage $V_4$. This voltage is applied through resistor R5 to the bases of transistors Q3 and Q4 and through resistor R3 to the bases of transistors Q1 and Q2. The emitters of transistors Q1 and Q2 are connected and through resistor R4 to feed amplifier U1 and capacitor C1. Capacitor C1 is connected to ground. The collector connection of transistor Q1 is at voltage $V_3$ and the collector connection of transistor Q2 is ground. Voltage $V_3$ is composed of the output voltage of amplifier U3 and the voltage which comes from resistor network R9, R10, R11, and R13. This resistive network receives only positive voltages from conductor 22c since negative voltages are blocked by diode D1. Resistive network R9, R10, R11 and R13 receives a negative input voltage at conductor $42a_2$ which is the inverse of positive voltage $V_2$ at conductor $42a_1$. The voltage which determines a negative output at amplifier U3 is composed of voltage minus $V_1$ through conductor $22a_2$ which passes through resistor R12 and the output voltage of resistive network R9, R10, R11 and R13. The voltage which determines a positive output from amplifier U3 is determined by a ground connection.

Voltage $V_4$ also feeds common emitter connected transistors Q3 and Q4 through resistor R5 which bifurcates and feeds the bases of Q3 and Q4. The collector of Q4 is connected to ground and the collector of Q3 is connected to conductor $22a_1$ which supplies voltage $V_1$ which is a voltage proportional to the atmospheric pressure from the atmosphere pressure sensor 21. The emitters of transistors Q3 and Q4 are connected together and supply voltage $V_8$ which passes through resistor R6 and over capacitor C2 to supply the input that determines the positive voltage output from amplifier U2. The voltage that determines a negative output from the amplifier U2 is determined by the feedback loop from the output of U2 through resistor R7 to the negative determining terminal of U2 and from resistor R8 which is connected to ground. The output of amplifier U2 is $V_0$.

$V_0$ is the output at conductor 74 to rate logic 66 and to high altitude discriminator 68 through conductor 86. $V_1$ is the input that comes in through conductor $22a_1$ from atmosphere pressure sensor 21. $V_1$ is a voltage proportional to the ambient atmospheric pressure. $V_2$ is a constant positive DC voltage used as a biasing voltage which comes from the power supply 70. $V_1$ is input at conductor $22a_1$ and $-V_1$ is input at conductor $22a_2$. $V_2$ is input at conductor $42a_1$ and $-V_2$ is input at conductor $42a_2$.

Voltage $V_2$ is applied through resistor R1 which causes a voltage drop so that a somewhat diminished voltage $V_6$ is applied to the positive terminal of amplifier U1. When $V_6$ is more positive than $V_7$ which is at the negative terminal of amplifier U1, the output voltage $V_4$ of amplifier U1 will be a positive voltage which will travel through resistor R3 to the bases of the common emitter connected transistors Q1 and Q2.

When $V_4$ is positive, NPN transistor Q1 will be on and PNP transistor Q2 will be off. When transistor Q1 is on, voltage $V_3$ will pass through the transistor and appear as voltage $V_5$ at the emitter connection to resistor R4. R4 is part of the RC charging network with capacitor C1 and voltage $V_7$ at the negative input terminal of amplifier U1 will increase expotentially to the maximum value of $V_5$ which is equal to $V_3$.

When $V_7$ charges to a value slightly greater in value than voltage $V_6$, the output of amplifier U1 will go negative, and $V_4$ will become negative. When $V_7$ is negative it will feed back through resistor R2 to voltage $V_6$ and cause voltage $V_6$ also to swing negative. $V_4$ will pass through resistor R3 to the bases of the Q1, Q2 common emitter connection and will turn transistor Q1 off and will turn transistor Q2 on. When transistor Q2 is on, voltage $V_7$ will discharge toward zero through capacitor C1 and resistor R4 since transistor Q2 has its collector connected to ground. When $V_7$ discharges to a value slightly less than $V_6$, the output of amplifier U1 will again swing positive and $V_4$ will also become positive. When $V_4$ goes positive it will make $V_6$ slightly more positive through resistor R2 and $V_4$ will pass through resistor R3 again to the common emitter connection Q1, Q2 and turn transistor Q1 on and transistor Q2 off and repeat the cycle as previously described.

Thus voltage $V_4$ will appear as a square wave. Voltage $V_4$ also passes through resistor R5 and feeds the base connections of the common emitter connection between NPN transistor Q3 and PNP transistor Q4. When $V_4$ is negative, transistor Q4 will be conducting and the output of transistor Q4 will be zero since its collector is grounded. When voltage $V_4$ is positive, transistor Q3 will be conducting and will pass voltage $V_1$ through transistor Q3 to resistor R6. Thus, voltage $V_8$ at resistor R6 will have the same relationship to voltage $V_1$ as voltage $V_5$ has to voltage $V_3$. Resistor R6 and capacitor C2 filter voltage $V_8$ which is the positive input to amplifier U2. Amplifier U2 scales voltage $V_8$ so that the proper voltage $V_0$ is output at conductors 74 which is applied to the rate logic 66 and conductor 86 which is applied to high altitude discriminator 68.

Voltage $V_5$ is the output of amplifier U3 and will remain as a positive output as long as the input to amplifier U3 at its negative determining terminal is less than zero. The input to amplifier U3 is $-V_1$ which is the negative of the atmosphere pressure sensor 21 output. To voltage $-V_1$ is added a negative voltage, $-V_2$, through resistor R11. This is modified by the positive feedback through resistor R13. The input to amplifier U3 is also modified by the input from conductor 22c which must pass through a diode before adding to voltage $-V_2$ and $-V_1$. A negative voltage will reverse bias the diode and nothing will pass. A positive voltage will forward bias the diode and will add directly to the negative voltages $V_2$ and $V_1$ through the resistive network R9 and R10. The voltage at conductor 22c is negative when the plane is ascending and positive when the plane is descending so that the resistive network of R9 and R10 only affect the input to amplifier U3 when the plane is descending.

Figure 6A:
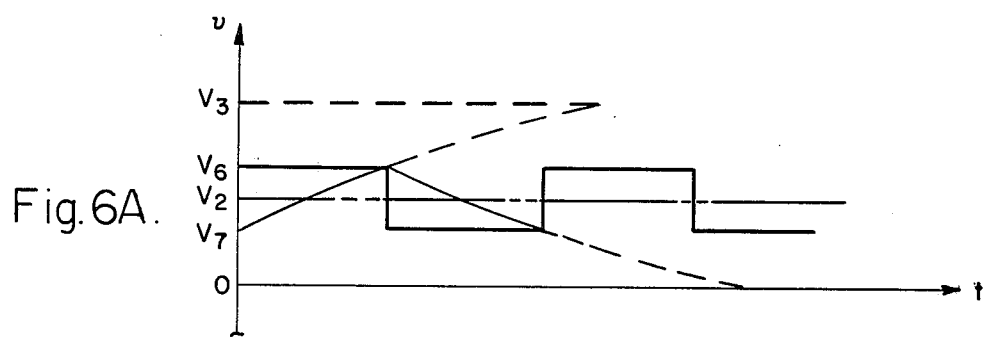
FIG. 6 is a series of graphs labeled 6A–6C showing voltage/time relationships for the cabin altitude function generator of FIG. 5.
Figure 6B:
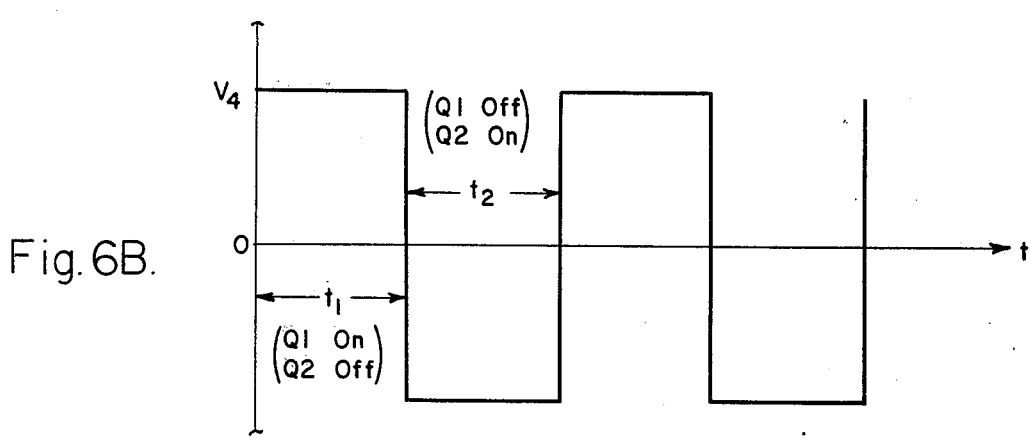
Figure 6C:
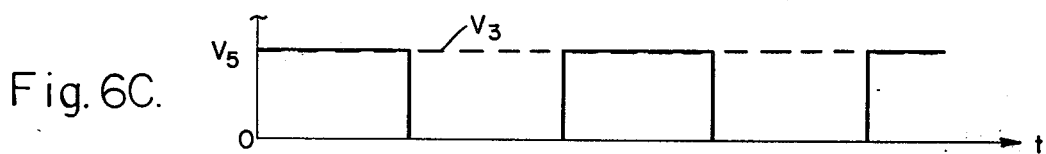

FIG. 6 is a series of graphs labeled 6A-6C which show the various voltage relationships associated with cabin altitude function generator 72. Graph 6A shows the relationship of voltages $V_3$, $V_6$, $V_2$ and $V_7$. As can be seen, voltage $V_6$ has symmetrical swings around voltage $V_2$ which is caused by feedback resistor R2. Voltage $V_7$ will expotentially charge towards voltage $V_3$ to a value slightly greater than $V_6$ whenever transistor Q1 is on. When Q1 is turned off and Q2 is turn on, voltage $V_7$ will exponentially discharge towards zero to a value slightly less than voltage $V_6$ which has shifted to the negative side of $V_2$ due to the negative feedback through resistor R2. When $V_7$ becomes less positive than $V_6$, the output of amplifier U1 goes positive, turns Q2 off and Q1 on thus repeating the cycle. Graph 6B shows voltage $V_4$ and its respective values when Q1 is on and Q2 is off and also when Q1 is off and Q2 is on. Graph 6C shows the relationship of $V_3$ and $V_5$. $V_5$ is equal to $V_3$ when Q1 is on and Q2 is off. When Q2 is on $V_5$ equals the collector voltage of Q2 which is at ground.

It will be noted that due to feedback resistor R2, voltage $V_6$ will be symmetrical with respect to $V_2$ since voltage $V_4$ is symmetrical with respect to zero and the average value of $V_6$ will be equal to $V_2$. It should also be noted that if the circuit is scaled so that $V_7$ is nearly linear, then the average value of $V_2$ is equal to $V_7$, because it is symmetrical around $V_2$. The average value of $V_7$ is equal to the average value of $V_5$ or $$V_7(ave) = V_5(ave)$$

Thus the following relationships are established:

$$V_2 = V_6(ave) = V_7(ave)$$

The average value of $V_5$ is equal to $V_3$ multiplied by the time period that Q1 is on ($t_1$) divided by the time period Q1 is on plus the time period when Q2 is on ($t_2$) or $$V_5 (ave) = V_3 \frac{t_1}{t_1 + t_2}$$

since $V_7 (ave) = V_2$ and $V_7 = V_5 (ave)$ then $V_2 = V_5 (ave)$ and $V_2 = V_3 \frac{t_1}{t_1 + t_2}$ or $\frac{V_2}{V_3} = \frac{t_1}{t_1 + t_2}$ The time period that Q1 is on divided by the time period Q1 is on plus the period Q2 is on is the duty cycle of $V_4$ or the duty cycle of $$V_4 = \frac{t_1}{t_1 + t_2}$$

$$= \frac{V_2}{V_3}$$

Since transistor Q3 and Q4 are driven by $V_4$ in the same manner as Q1 and Q2, $V_8$ bears the same relationship to $V_1$ as $V_5$ bears to $V_3$ $$V_8 (ave) = V_1 \left( \frac{t_3}{t_3 + t_4} \right)$$

since the duty cycle is determined by $V_4$, $$\frac{t_3}{t_3 + t_4} = \frac{t_1}{t_1 + t_2}$$

for similar transistors.

Therefore, $V_8 (ave) = V_1 \left( \frac{V_2}{V_3} \right)$ since $V_0 = K V_8 (ave)$ then $V_0 = \frac{K_1 V_1 V_2}{V_3}$ since $V_1 \alpha P_a$ and $V_3 = K_2 V_1 + K_3$
$\alpha K_2 K_2 P_a + K_c$ and $V_2$ is a constant therefore $V_0 \alpha \frac{K_5 P_a}{K_2 P_a + K_c}$ $\alpha \frac{K_5}{K_2 + \frac{K_3}{P_a}}$ which gives an output voltage proportionate to the sensed atmospheric pressure.

Figure 7A:
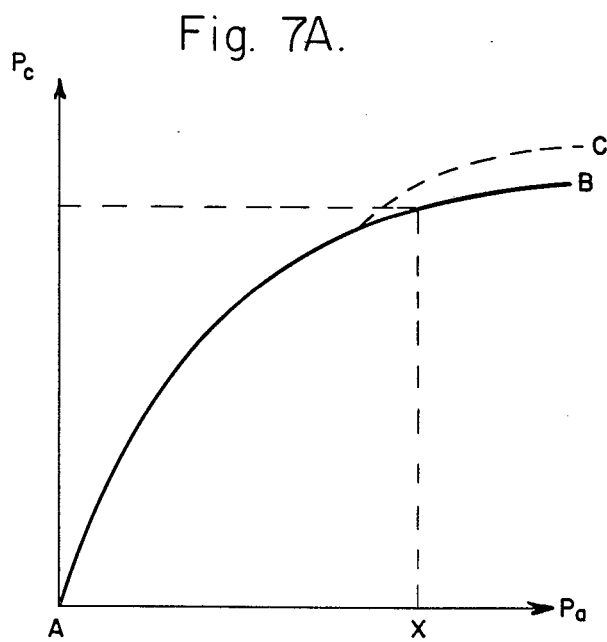
FIG. 7A is a graph of cabin pressure vs. ambient pressure for the controller of FIG. 2.

FIG. 7A is a graph of the function generated by the preferred embodiment of cabin altitude function generator 72. Curve AB is the function used during climb and cruise while no input from atmosphere pressure sensor 21 is passing into the circuit through conductor 22c due to the reverse biasing of diode D1. The orientation of diode D2 prevents resistors R9 and R10 from affecting the characteristics of amplifier U3. Curve AC is the function used during descent when diode D1 is forward biased and a positive voltage is added into the input terminal of amplifier U3 through resistive network R9 and R10, R11 and R13. In the preferred embodiment curve AB is generated on the basis of keeping the cabin pressure rates at a minimum when the aircraft is ascending at its maximum rate without exceeding the maximum $\Delta P$ for which the aircraft is designed. For curve AB, $P_c$ as generated by the function is always greater than $P_a$ as long as $P_a$ is less than or equal to X. For $P_a$ greater than X, $P_c$ becomes less than $P_a$. Under these conditions it can be seen that when attempting to land at an altitude which has a corresponding pressure greater than X, the cabin pressure would try to be less than the ambient pressure. This would be the equivalent of commanding the outflow valve to open so that the inside cabin pressure could go below the outside ambient pressure which is an impossible condition. This would result in the outflow valve being fully opened with no cabin pressure rate control. In order to avoid this, resistors R9 and R10 are introduced on descent influencing the denominator of the cabin pressure function generated in the preferred embodiment by making the negative voltage input to amplifier U3 less negative thus lowering the value of voltage $V_3$. The function of the preferred embodiment cabin altitude function generator is $$Pc = \frac{P_a}{K_2 P_a + K_3}.$$

Since the value of $K_2 P_a + K_3$ is proportional to $V_3$, lowering of $V_3$ will lower the denominator and thus give a curve as depicted by curve AC. The situation where $P_a$ is greater than point X or the altitude of the aircraft is lower than the altitude corresponding to point X, does not present a problem on takeoffs due to the fact that the aircraft ambient pressure $P_a$ will be decreasing faster than the cabin pressure and operation on the curve AB will never occur and $P_a$ will always be less than $P_c$.

Figure 7B:
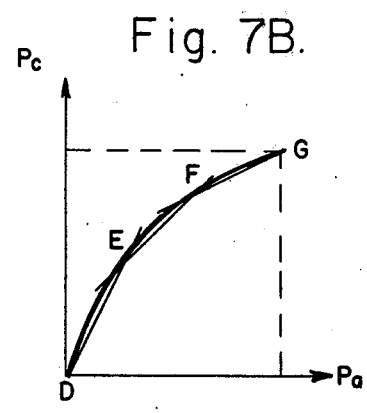
FIG. 7B is a graph of cabin pressure vs. ambient pressure for a prior art controller.

FIG. 7B shows the relationship between the cabin pressure ($P_c$) and the ambient aircraft pressure ($P_a$) of previous automatic cabin pressure controllers. The ideal relationship as shown in FIG. 7A by curve A–B was attempted through straight line approximations DE, EF and FG. Although previous attempts consist of many straight line segments to approximate the ideal curve, three straight line segments are depicted for demonstration. As can be seen, two deficiencies occur in this method of constructing a cabin pressure versus ambient pressure curve. The first is that the straight line approximations do not quite achieve the curve as desired; the second is that through the use of straight line approximations, points of inflection occur at every joining of the straight line segments. The points of inflection do not appear to be far reaching in effect on the curve $P_c$ versus $P_a$. However, when the rate of change of cabin pressure (the first derivative of $P_c$) is calculated, points of inflection appear as spikes on what should appear as a straight line for a constant rate of change of cabin pressure.

Figure 8:
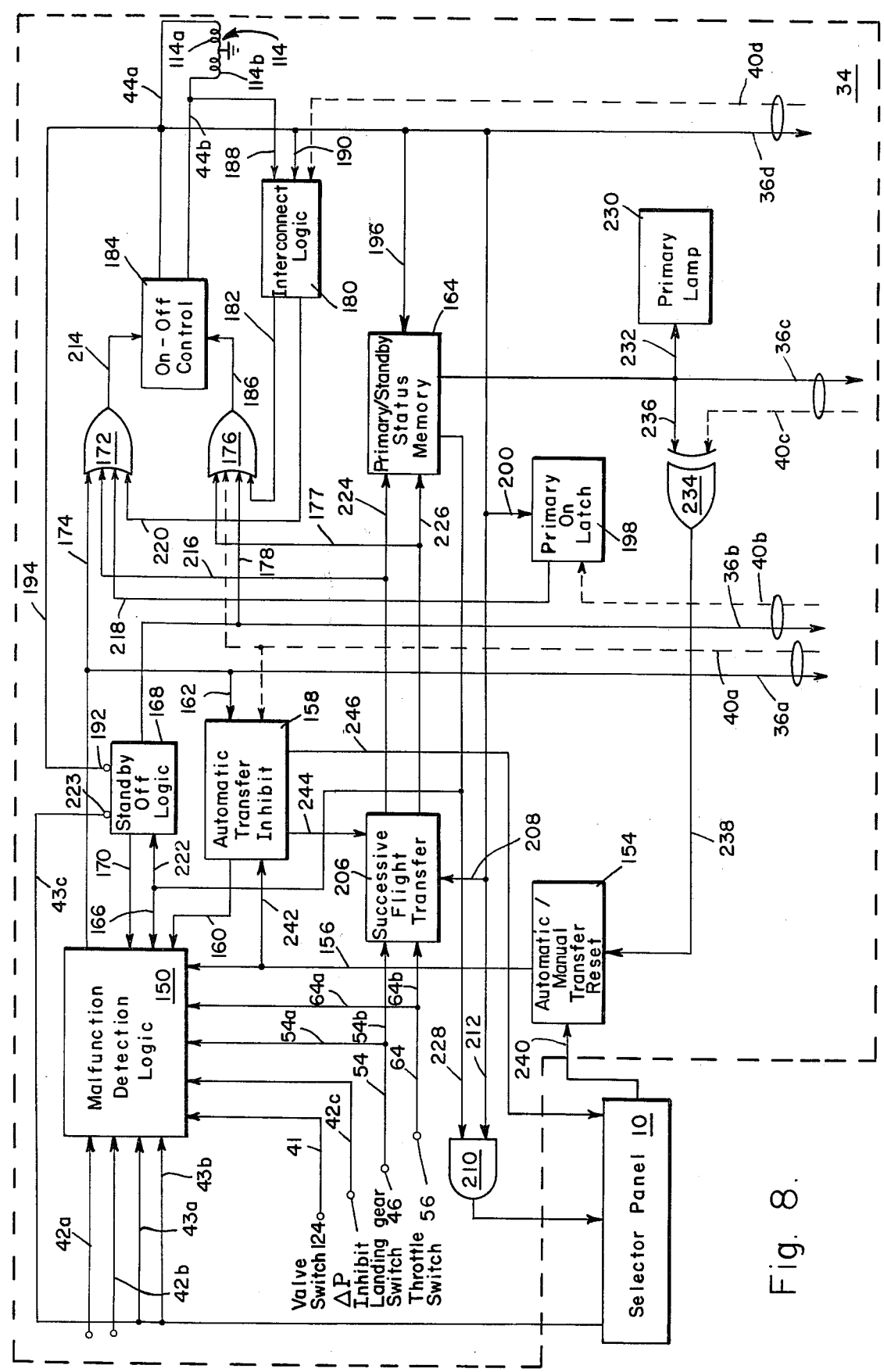
FIG. 8 is a block diagram of automatic transfer circuit of FIG. 1.

Referring now to FIG. 8, the automatic transfer circuit 34 and associated components are illustrated in detail, it being understood that automatic transfer circuit 32 has an identical set of components similarly connected Malfunction detection logic 150 is connected to power supply 70 of the automatic controller 16 through conductors 42a and 42b and is connected to cabin pressure selector 10 through conductors 43a and 43b. Malfunction detection logic 150 is also connected to a valve switch 124 through conductor 41, ΔP limit logic 80 through conductor 42c, throttle switch 56 through conductor 64a, landing gear switch 46 through conductor 54a, automatic/manual transfer reset 154 through conductor 156, automatic transfer inhibit 158 through both conductors 160 and 162, to primary/standby status memory 164 through conductor 166, to standby off logic 168 through conductor 170, to OR gate 172 through conductor 174, and to automatic transfer circuit 32 through conductor 36a.

The connections in automatic transfer circuit 32 from conductors originating in automatic transfer circuit 34 are shown as dotted lines adjacent to the conductor originating in automatic transfer circuit 34 and included within a single circle. With this in mind it can be seen that malfunction detection logic 150 of automatic transfer circuit 34 is connected to automatic transfer inhibit 158 and OR gate 176, both of automatic transfer circuit 32 through conductor 36a.

OR gate 176 of automatic transfer circuit 34 is connected with successive flight transfer 206 through conductor 177, to standby off logic 168 through conductor 178, and to interconnect logic 180 through conductor 182 on its input side.

OR gate 176 is connected to on-off control 184 through conductor 186 on its output side. On-off control 184 is connected to automatic cabin pressure controller 17 through conductors 44a and 44b, to interconnect logic 180 through conductors 188 and 190, to standby off logic 168 through inverter 192 via conductor 194, to primary/standby status memory 164 through conductor 196, to primary on latch 198 through conductor 200, to successive flight transfer 206 through conductor 208, to AND gate 210 through conductor 212, and to interconnect logic 180 of automatic transfer circuit 32 through conductor 36d. The output side of OR gate 172 is connected to on-off control 184 through conductor 214. In addition to being connected to malfunction detection logic 150 through conductor 174, the input side of OR gate 172 is also connected to successive flight transfer 206 through conductor 216, primary on latch 198 through conductor 218, and interconnect logic 180 through conductor 220.

Interconnect logic 180 is connected to on-off control 184 of automatic transfer circuit 32 through conductor 40d. Primary on latch 198 is connected to standby off logic 168 of automatic transfer circuit 32 through conductor 40b, so standby off logic 168 of automatic transfer circuit 34 is connected to primary on-latch 198 of automatic transfer circuit 32. Standby off logic 168 also is connected to primary/standby status memory 164 through conductor 222 and to selector panel 10 through inverter 223 via conductor 43c. Primary/standby status memory 164 has dual connections to successive flight transfer 206 through conductors 224 and 226. Primary/standby status memory 164 is connected to AND gate 210 through conductor 228, to primary lamp 230 through conductor 232, to exclusive OR gate 234 of automatic transfer circuit 34 through conductor 236, and to exclusive OR gate 234 of automatic transfer circuit 32 through conductor 36c.

Since the circuits of automatic transfer 32 and 34 are identical, exclusive OR gate 234 of automatic transfer circuit 34 receives an input from primary/standby status memory 164 of automatic transfer circuit 32 through conductor 40c. On its output side, exclusive OR gate 234 is connected to auto/manual transfer reset 154 through conductor 238. Auto/manual transfer reset 154 is connected to cabin pressure selector 10 through conductor 240 and to auto transfer inhibit 158 through conductor 242. Auto transfer inhibit 158 is connected to successive flight transfer 206 through conductor 244 and to cabin pressure selector 10 through conductor 246. Successive flight transfer 206 is connected to throttle switch 56 through conductor 64b and to landing gear switch 46 through conductor 54b.

During each flight one controller is operated in the primary mode and one controller is operated in the standby mode. When the aircraft lands, successive flight transfer 206 will switch modes of the controllers for the next flight. The specific details of connections and operation of successive flight transfer 206 will be discussed in connection with FIG. 11. However, its output is of immediate interest. If automatic cabin pressure controller 17 is "on", successive flight transfer 206 of automatic transfer circuit 34 will issue a true signal to primary/standby status memory 164 through conductor 226 and to OR gate 176 through conductor 177 upon closing of the landing gear switch 46 at aircraft touchdown. Any true input at OR gate 176 is passed through conductor 186 to on-off control 184. On-off control 184 then energizes coil 114b of control switch 114 which opens contact 114c between driver 110 and motor 116 (see FIG. 2). If automatic cabin pressure controller 17 is off, successive flight transfer 206 will issue a true signal to primary/standby status memory 164 through conductor 224 and to OR gate 172 through conductor 216 upon closure of the landing gear switch 46. Any true input at OR gate 172 is passed through conductor 214 to on-off control 184. On-off control 184 then energizes coil 114a of control switch 114 which closes contact 114c between driver 110 and motor 116 (see FIG. 2).

Successive flight transfer 206 receives an input through conductor 208 from on-off control 184 to indicate whether or not the controller is on. Successive flight transfer 206 also programs the primary/standby status memory 164 and instructs it as to which mode automatic cabin pressure controller 17 will operate for the next flight. If a true signal is issued to primary/standby status memory 164, through conductor 226, it will indicate that automatic cabin pressure controller 17 is going to be operating in the standby mode. If a true signal is issued through conductor 224 that will indicate that automatic cabin pressure controller 17 will be operating in the primary mode for the upcoming flight.

When automatic cabin pressure controller 17 is operating in the standby mode, automatic transfer circuit 34 is monitoring the performance of cabin pressure of automatic cabin pressure controller 16. If cabin pressure controller 16 malfunctions, automatic transfer circuit 34 will switch control to automatic cabin pressure controller 17. When automatic cabin pressure controller 17 is operating in the primary mode, automatic transfer circuit 34 is disabled and automatic transfer circuit 32 monitors the performance of cabin pressure controller 17. Automatic transfer circuit 32 will switch control to automatic cabin pressure controller 16 if automatic cabin pressure controller 17 malfunctions.

Malfunction detection logic 150 receives inputs from controller 16, cabin pressure selector panel 10, throttle switch 56, landing gear switch 46 and the valve switch 124; the specific details of which will be discussed in connection with FIG. 9. On the basis of the inputs which malfunction detection logic 150 receives, it is able to determine such information as whether the aircraft is in flight, whether it is ascending or descending, whether the cabin pressure change rate exceeds the selected rate, whether the ΔP limit logic 80 is controlling the cabin pressure rate of change, whether a flow problem exists in the aircraft, and whether the primary automatic cabin pressure controller is adequately powered.

The normal output of malfunction detection logic 150 at conductor 174 is a false or zero output. Malfunction detection logic 150 of the preferred embodiment is set or its output at conductor 174 goes true if, while the aircraft is in flight, either the primary automatic cabin pressure controller loses power, or the cabin pressure is ascending at a rate in excess of the selected rate and neither the ΔP limit logic 80 is controlling nor does a flow problem exist, or the aircraft cabin altitude is descending at a rate greater than the selected rate. A true output from the malfunction detection logic 150 at conductor 174 simultaneously turns automatic cabin pressure controller 17 on and automatic cabin pressure controller 16 off.

Automatic cabin pressure controller 17 is turned on by the true signal passing to OR gate 172 through conductor 174 which in turn activates on-off control 184 as previously described. Automatic cabin pressure controller 16 is turned off by passing the true signal to automatic transfer circuit 32 through conductor 36a. The connections in automatic transfer circuit 32 can be seen by dotted line 40a which shows the identical connections between the malfunction detection logic of automatic transfer circuit 32 and automatic transfer circuit 34. The true signal is received by OR gate 176 of automatic transfer circuit 32 through conductor 40a. It is then passed to its on-off control 184 through conductor 186 which turns its controller off as previously described.

Not only does malfunction detection logic 150 turn one controller off and one controller on, it also sets automatic transfer inhibit 158 of automatic transfer circuit 34 and an identical automatic transfer inhibit in automatic transfer 32. Again, the connection in automatic transfer circuit 32 can be seen in dotted conductor 40a which comes from automatic transfer circuit 32. By setting automatic transfer inhibit, automatic transfer back to the malfunctioning controller is blocked, the malfunction detection logic 150 is disabled and the successive flight transfer circuit 206 is inhibited so that the status of the controllers will remain the same as when the malfunction occurred.

When automatic transfer inhibit 158 is set, it will relay a signal to the cabin pressure selector panel through conductor 246 which will illuminate a light 3 (see FIG. 12) indicating to the flight crew that automatic transfer function is locked out. Additionally, the fact that the standby is in control of the cabin pressure rate of change is annunciated to the crew through AND gate 210, which receives a true signal from the primary/standby memory 164 through conductor 228 when the controller is in the standby mode. In addition to the signal that it receives through conductor 228, AND gate 210 also receives a signal through conductor 212 which comes from on-off control 184 which is true when the controller 17 is on. Whenever the controller 17 is standby and on, the output of the AND gate 210 will go to cabin pressure selector panel 10 and illuminate a light 2 (FIG. 12) which indicates that the standby is in control of the cabin pressure.

Provision is made on cabin pressure selector panel 10 for the manual selection of either the primary or the standby controller. When toggle switch 1 (see FIG. 12) is moved to the standby position, it will issue a true signal through conductor 43b which will set malfunction detection logic 150 and malfunction detection logic will issue a true signal through conductor 174. This true will also issue through conductor 43c to inverter 223 which is connected to standby off logic 168. The inverter will change the true signal to a false and will have no effect on standby off logic.

When the toggle switch is moved to the primary position a false signal is issued through conductors 43b and 43c. This false signal will arrive at malfunction detection logic 150 and will not change its output. However, a false signal through conductor 43c will go to inverter 223, causing a true signal to be issued to standby off logic 168, setting it so that its output will be a true. When standby off logic 168 is set and is issuing a true signal as its output, the true signal will reset malfunction detection logic 150 and its output at conductor 174 will be a false. The true signal will then pass to OR gate 176 through conductor 178 which turns the automatic cabin pressure controller 17 off as previously described.

This true signal is also applied to automatic transfer circuit 32 through conductor 36b. This connection can be seen by dotted conductor 40b which shows the connection between standby off logic of automatic transfer circuit 32 to primary on latch 198 of automatic transfer circuit 34.

When automatic cabin pressure controller 16 is turned off by on-off control 184, the absence of a true signal is communicated through conductor 194 to inverter 192. Inverter 192 then issues a true output to standby off logic 168 which resets standby off logic. Resetting standby off logic 168 changes its output to zero or a false signal thus completing the loop and returning standby off logic to its normal state. Primary on latch 198 is set by a true signal from standby off logic of automatic transfer circuit 32 and will issue a true signal to OR gate 172 which will turn automatic cabin pressure controller 17 on as has been previously described. When automatic cabin pressure controller system 17 is turned on by on-off control 184, a true signal is issued which will return to primary on latch 198 through conductor 200 and reset the primary on latch again to its normal state which is no output.

If automatic transfer has taken place and the flight crew wishes to return control of the cabin pressure rate to a primary controller, this can also be done by pushing the reset switch in cabin pressure selector panel 10. Depressing the reset button will issue a signal to automatic/manual transfer reset 154 which will then pass to malfunction detection logic 150 through conductor 156 and automatic transfer inhibit 158 through conductor 242. Resetting the malfunction detection logic 150 will cause the output at conductor 174 to go to zero or false. Resetting the automatic transfer inhibit 158 will remove the previously established inhibit and will extinguish the illumination of transfer lock out in the cabin pressure selector panel 10. Resetting automatic transfer inhibit 158 will also remove the inhibit from successive flight transfer 206 through conductor 244 and from malfunction detection logic 150 through conductor 160. Thus while use of toggle switch 1 (FIG. 12) alone will restore control to the primary controller, a transfer lockout switch which may be incorporated into the transfer lockout light 3, may be activated to reset the automatic monitoring and transfer features associated with the standby controller.

When primary/standby status memory 164 is instructed by successive flight transfer 206 as to whether automatic cabin pressure controller will be primary or standby, it will issue a signal to exclusive OR gate 234 through conductor 236. A true input into exclusive OR gate 234 indicates that automatic cabin pressure controller is in a standby mode. A false input indicates primary mode. This true signal is also passed to automatic transfer circuit 32 through conductor 36c. The connections within automatic transfer circuit 32 can be seen by the identical connections within automatic transfer circuit 34 as shown by dotted conductor 40c which is input into exclusive OR gate 234. Exclusive OR gate 234 receives the output coming from primary/standby status memory of automatic transfer circuit 32 through conductor 40c.

If both inputs to exclusive OR gate 234 are either true or false indicating that both controllers are either in the primary or standby mode, exclusive OR gate 234 will issue a true signal to the automatic/manual transfer reset 154 through conductor 238. Automatic/manual transfer reset 154 will then reset the malfunction detection logic 150 and automatic transfer inhibit 158. By resetting malfunction detection logic 150 it will indicate that, whatever its output is, it should be reset to zero. By this, the controllers are prevented from simultaneously operating in either the primary or in the standby mode.

Primary/standby status memory 164 will also issue a true signal to primary lamp 230 through conductor 232 if automatic cabin pressure controller 17 is primary for this flight. This lamp indicates to the flight crew which cabin pressure controller is operating in the standby mode so that if a malfunction is noted by the flight crew, the maintenance crew will know which automatic cabin pressure controller malfunctioned. Operation of automatic transfer inhibit 158 upon malfunction prevents the change of primary controller by successive flight transfer 206 upon landing and maintains illumination of primary lamp 230 for repair identification.

In order to prevent a situation where both automatic cabin pressure controllers are either on or off, an interconnect logic 180 is provided, the detailed operation of which will be discussed in connection with FIG. 11. Interconnect logic 180 receives inputs from on/off control 184 of automatic transfer circuit 34 and on-off control of automatic transfer circuit 32. If automatic cabin pressure controller 17 is on, interconnect logic 180 will receive a true input through conductor 190, if it is off it will receive a true input through conductor 188. Whether automatic cabin pressure controller 17 is on is also issued as a true signal to the interconnect logic of automatic transfer circuit 32. The connections in automatic transfer circuit 32 can best be seen through dotted conductor 40d which connects interconnect logic 180 with on-off control of automatic transfer circuit 32.

Interconnect logic 180 will evaluate these inputs and determine whether both controllers are on or both controllers are off. If both controllers are on, interconnect logic 180 will issue a true signal to OR gate 176 through conductor 182 which, in turn, will turn the automatic cabin pressure controller off as has been previously described. If both controllers are off, interconnect logic 180 will issue a true signal to OR gate 172 through conductor 220 which, in turn, will turn automatic cabin pressure controller 17 on as has been previously described.

Figure 9:
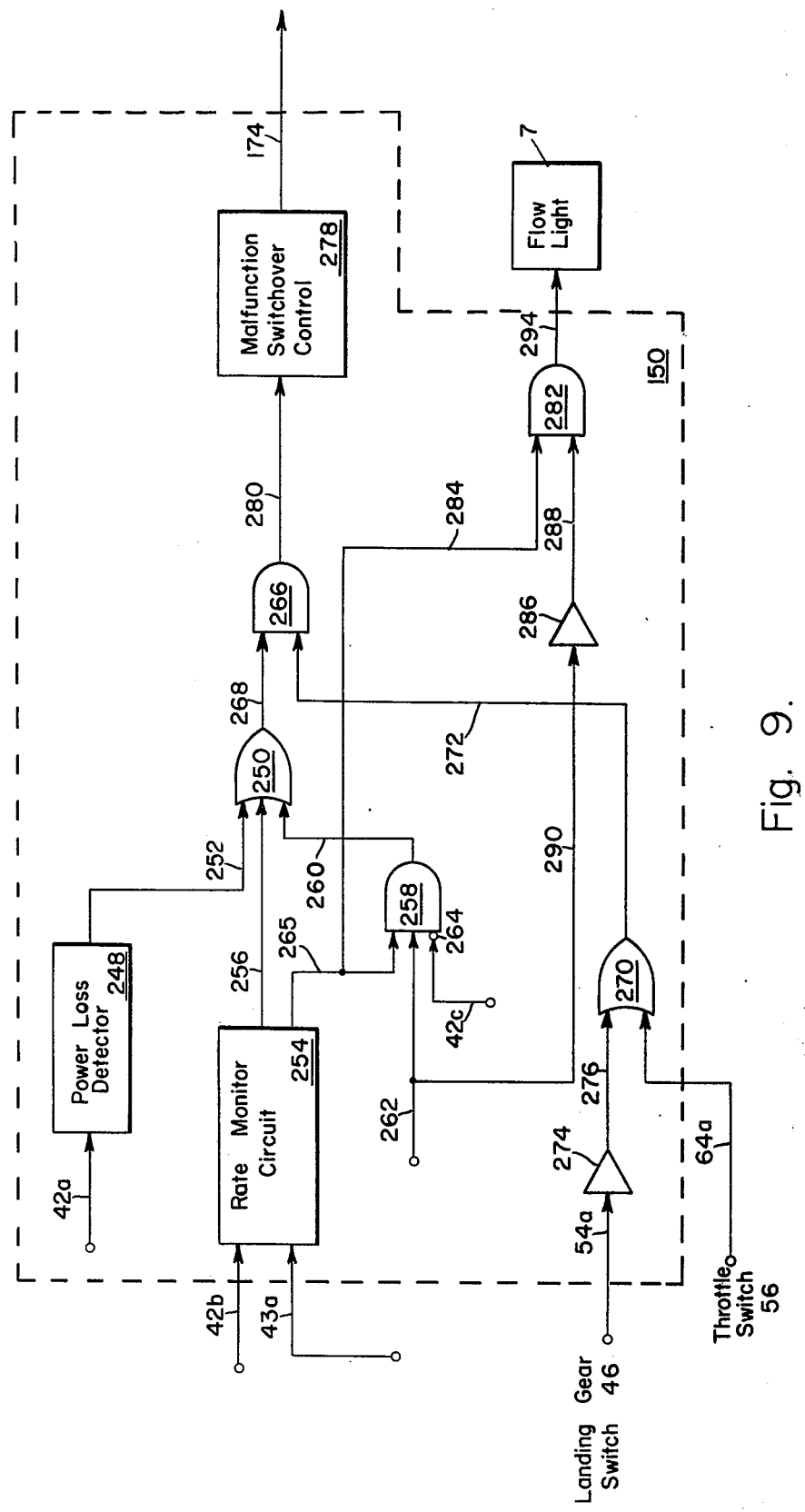
FIG. 9 is a logic diagram of a malfunction detection logic of FIG. 8.

Referring now to FIG. 9, the basic malfunction monitoring and switch over circuitry of the malfunction detection logic 150 of automatic transfer circuit 34 is shown in detail, it being understood that malfunction detection logic of automatic transfer circuit 32 has an identical set of components similarly connected. Additional inputs described in connection with FIG. 8 for switching between primary and standby controllers are not duplicated herein.

Power loss detector 248 is connected to the power supply of automatic cabin pressure controller 16 through conductor 42a and the input side of OR gate 250 through conductor 252. The input side of OR gate 250 is also connected to rate monitor circuit 254 through conductor 256 and to AND gate 258 through conductor 260. Rate monitor circuit 254 is connected to automatic cabin pressure controller 16 through conductor 42b and to cabin pressure selector panel 10 through conductor 43a.

AND gate 258 is connected to valve switch 124 through conductors 262 and 41 (FIG. 8) and to the inhibit generator of ΔP limit logic of automatic cabin pressure controller 16 (FIG. 1) through inverter 264 through conductor 42c and to rate monitor circuit 254 through conductor 265. The output side of OR gate 250 is connected to the input side of AND gate 266 through conductor 268. The input side of the AND gate 266 is also connected to the output side of OR gate 270 through conductor 272. The input side of OR gate 270 is connected to throttle switch 56 through conductor 64a and to inverter 274 through conductor 276. Inverter 274 is connected to landing gear switch 46 through conductor 54a.

The output side of AND gate 266 is connected to malfunction switch over control 278 through conductor 280. Malfunction switch over control 278 is connected to OR gate 172 (FIG. 8) through conductor 174.

The input side of AND gate 282 is connected to rate monitor circuit 254 through conductor 284 and to inverter 286 through conductor 288. Inverter 286 is connected to valve switch 124 through conductors 290 and 262. The output side of AND gate 282 is connected to flow light 7 (FIG. 12) through conductor 294.

Malfunction switch over control 278 will issue a true signal to OR gate 172 (see FIG. 8) through conductor 174 which will turn off automatic cabin pressure controller 16 and turn on automatic cabin pressure controller 17 when it receives a true signal from AND gate 266 through conductor 280. AND gate 266 will issue a true output only when the input from OR gate 250 through conductor 268 and the input from OR gate 270 through conductor 272 are both true.

The output from OR gate 270 indicates whether or not the aircraft is in flight. If the aircraft is in flight the output will be true, if the aircraft is on the ground the output will be false. Flight is indicated when either one of two inputs to OR gate 270 is true. The first input from throttle switch 56 will be true when the throttle is in the advanced position. The second input through conductor 276 from inverter 274 will be true when the signal from landing gear switch 46 through conductor 54a to inverter 274 is false. The landing gear switch 46 issues a false signal when the landing gear switch is open. When the aircraft is on the ground, landing gear switch will be closed and will be issuing a true signal. This true signal will arrive at inverter 274 and a false signal will be issued to OR gate 270 through conductor 276. When the aircraft is in the air the landing gear switch will be closed and a false signal will be issued to inverter 274. When a false signal is received by inverter 274 a true signal is passed to OR gate 270 through conductor 276 thus, when the aircraft is in the air a true signal will be issued by OR gate 270 to AND gate 266 through conductor 272. Input from the throttle switch provides a flight signal when the aircraft is in the process of taking off. Whether the aircraft is in flight acts as an inhibit since a true input will be present when the aircraft is in flight and a true input is necessary before AND gate 266 will issue a true output to malfunction switch over control 278.

OR gate 250 will issue a true output to AND gate 266 through conductor 268 when either of its three inputs is true. One input to OR gate 250 is from power loss detector 248. Power loss detector 248 receives a power signal from automatic cabin pressure controller 16. As long as power from the power supply is within a specified range in automatic cabin pressure controller 16 the output of power loss detector 248 is false. When power deviates from the specified range in automatic cabin pressure controller 16, power loss detector 248 issues a true signal to OR gate 250 through conductor 252. This true signal will be passed to AND gate 266 through conductor 268 which, in turn, will issue a true signal to malfunction switch over control 278 if a true signal has been received from OR gate 270 indicating that the aircraft is in flight.

A second input to OR gate 250 comes from rate monitor circuit 254. Rate monitor circuit 254 receives an input of the sensed cabin pressure climb rate from automatic cabin pressure controller 16 through conductor 42b and the selected rate limit from cabin pressure selector panel 10 through conductor 43a. Rate monitor 254 compares these two inputs and determines whether the cabin pressure change rate exceeds the selected rate limit. If the aircraft is descending and the sensed rate exceeds the selected rate limit it will issue a true signal to OR gate 250 through conductor 256. This true signal will be passed by OR gate 250 to AND gate 266 through conductor 268 as has been previously described.

The third input to OR gate 250 of the preferred embodiment comes from AND gate 258. AND gate 258 receives three inputs, all of which must be true before it will issue a true signal to OR gate 250. The first input is from rate monitor circuit 254. When rate monitor circuit 254 determines that the sensed cabin pressure change rate exceeds the selected rate limit and the aircraft is ascending, it will issue a true signal to AND gate 258 through conductor 265.

The second input to AND gate 258 is from valve switch 124. When the valve switch is closed it will issue a false signal. A true signal will be issued by the valve switch 124 when it is open.

The third input to AND gate 258 is from ΔP limit logic of automatic cabin pressure controller 16. Under normal conditions the inhibit generator of ΔP limit logic will be issuing a false signal which will be input to inverter 264 through conductor 42c. The output of inverter 264 under normal conditions will be a true signal and will not block the output of the AND gate 258. When the ΔP limit logic is incrementing the cabin pressure rate of change it will also issue a true signal to inverter 264 through conductor 42c. The true signal arriving at inverter 264 will be passed to AND gate 258 as a false signal thus inhibiting the output of AND gate 258. The output of AND gate 258, when true, indicates that the cabin is ascending at a rate greater than the preselected rate limit and the output flow valves are not completely closed and that the ΔP limit logic is not controlling the cabin pressure rate of change.

Malfunction switchover control 278 will issue a true signal indicating that automatic cabin pressure controller 17 should be turned on only when the plane is in flight and either the automatic cabin pressure controller 16 has lost power, or the cabin is descending at a rate greater than the selected rate, or the cabin is ascending at a rate greater than the selected rate limit while the ΔP limit logic is not in control and the outflow valve is not completely closed.

Malfunction detection logic 150 performs an annunciation function in addition to detecting a malfunction in the primary controller. The output of rate monitor circuit 254 bifurcates and one output goes to AND gate 258 and the other to AND gate 282 through conductor 284. AND gate 282 also receives an output from inverter 286 through conductor 288. The input to inverter 286 comes from valve switch 124. As was said earlier, valve switch 124 issues a true signal when the outflow valve is open and a false signal when the valve is closed. When the outflow valve is closed, the false signal is input to inverter 286 which will pass a true signal to AND gate 282 through conductor 288. AND gate 282 will issue an output through conductor 294 to cabin pressure selector panel 10 illuminating flow light 7 when it receives a signal from rate monitor circuit 254 that the altitude of the cabin is ascending at a rate greater than the selected rate limit and the outflow valve closed. Thus, illumination of flow light 7 indicates to the flight crew that the cabin pressure is decreasing while the outflow valves are fully closed. This means that there is a leak on the aircraft of a magnitude greater than the cabin inflow and that the failure to properly pressurize is not due to a faulty automatic cabin pressure controller. The crew is then aware that it must either plug the leak or increase inflow to permit proper control of cabin pressure.

Figure 10:
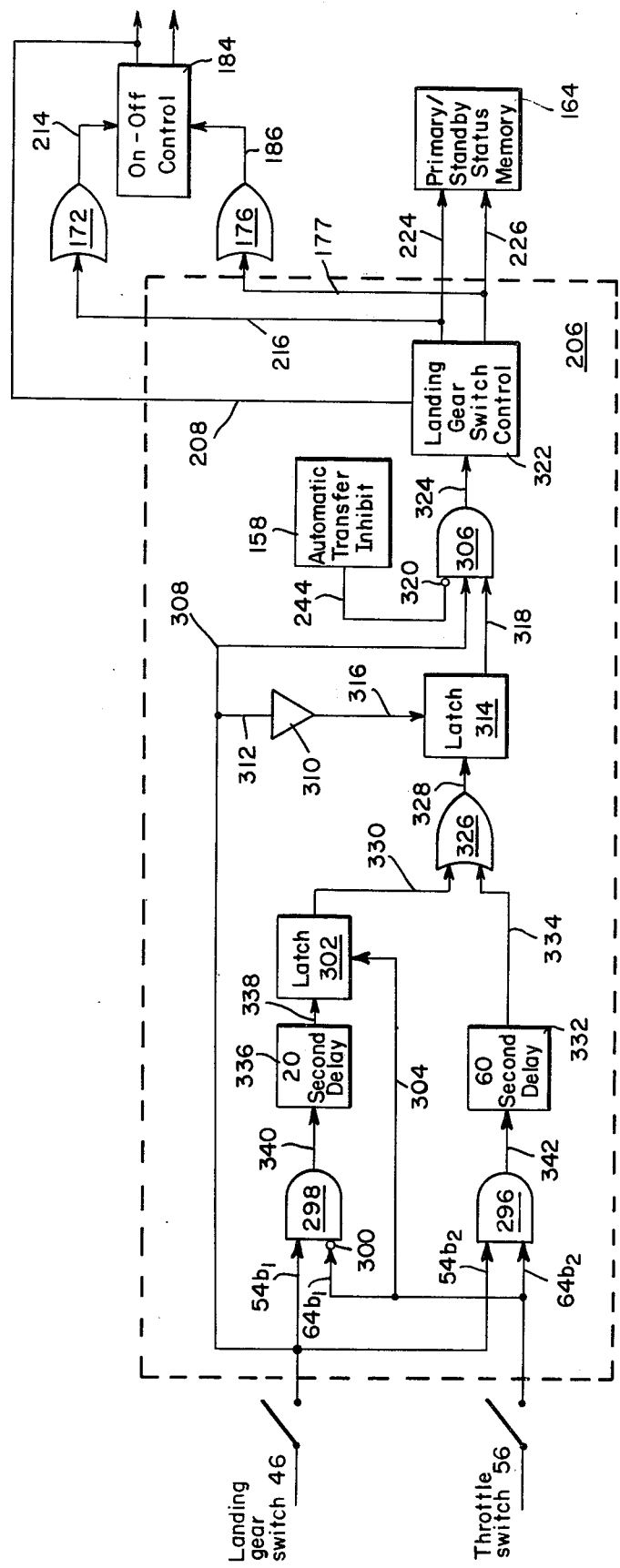
FIG. 10 is a logic diagram of a successive flight transfer of FIG. 8.

Referring now to FIG. 10, the detailed connections of successive flight transfer circuit 206 are illustrated. The throttle switch 56 is connected via conductor $64b_2$ to an AND gate 296, to AND gate 298 through inverter 300 via conductor $64b_1$, and to a latch 302 through conductor 304. The landing gear switch 46 is connected via conductor $54b_2$ to AND gate 296, to AND gate 298 through conductor $54b_1$, to AND gate 306 through conductor 308, and to inverter 310 through conductor 312. Inverter 310 is connected to a latch 314 through conductor 316.

The input side of AND gate 306 is also connected to latch 314 through conductor 318 and the inverter 320 of AND gate 306 is connected to automatic transfer inhibit 158 through conductor 244. The output side of AND gate 306 is connected to landing gear switch control 322 through conductor 324. Landing gear switch control 322 is connected to primary/standby status memory 164 through conductors 224 and 226, to OR gate 172 through conductor 216, and to OR gate 176 through conductor 177 (see FIG. 8). Landing gear switch control 322 is also connected to on-off control 184 through conductor 208. Latch 314 is connected to OR gate 326 through conductor 328. OR gate 326 is connected to latch 302 through conductor 330 and to sixty second delay 332 through conductor 334. Latch 302 is connected to twenty second delay 336 through conductor 338. Twenty second delay 336 is connected to the output side of the AND gate 298 through conductor 340. Sixty second delay 332 is connected to the output side of AND gate 296 through conductor 342.

AND gate 298 and AND gate 296 both receive two inputs. One input is from the landing gear switch 46 and the other input is from the throttle switch 56. Landing gear switch 46 will issue a true signal when it is closed, indicating that the aircraft is on the ground. Throttle switch 56 will issue a true signal when it is advanced, indicating that the aircraft is taking off or is in flight. The input to AND gate 298 from throttle switch 56 must pass through inverter 300 before it becomes an input to AND gate 298 thus when the aircraft is on the ground, the input to AND gate 298 is true and when the aircraft is in flight, the input to AND gate 298 is true. When the aircraft is in flight, the input to AND gate 296 is true. Since neither the input to AND gate 298 through conductor $54b_1$ nor the input to AND gate 296 through conductor $54b_2$ from landing gear switch 46 passes through an inverter, both AND gates 296 and 298 receive true inputs only when the aircraft is on the ground. If landing gear switch 46 closes, it issues a true signal to AND gate 298 through conductor $54b_1$ and to AND gate 296 through conductor $54b_2$. If the throttle switch 56 is not in the advanced position, indicating that the aircraft has landed, it issues a false signal to AND gate 296 through conductor $64b_2$ and to inverter 300 through conductor $64b_1$. AND gate 296 will have a false output while AND gate 298 will have a true output since the false input to inverter 300 results in a true input to AND gate 298. This condition indicates that the aircraft has landed and the controller should switch modes. When AND gate 298 has a true output, it is passed to twenty second delay 336 through conductor 340. The twenty second delay is to eliminate transfers due to bounce on landing. After the twenty second delay a true signal is passed to latch 302 through conductor 338. Latch 302 is set and will issue a true output to OR gate 326 through conductor 330. OR gate 326 will then issue a true signal to set latch 314 through conductor 328. Latch 314 then issues a true signal to AND gate 306 through conductor 318 which passes to landing gear switch control 322 through conductor 324. Landing gear switch control 322 then switches modes between the controllers as described in connection with FIG. 8.

During take off, throttle switch 56 is advanced issuing a true signal to AND gate 296 and, through inverter 300, a false signal to AND gate 298. Thus the output of AND gate 298 becomes a false and the output of AND gate 296 becomes a true. The output of AND gate 296 passes to sixty second delay 332 through conductor 342. The true signal from throttle switch 56, when advanced, will reset latch 302 through conductor 304 and the output of latch 302 will become a false to OR gate 326 through conductor 330. Latch 302 is reset so that the transfer can again take place the next time the aircraft lands. If landing gear switch 46 does not open within 60 seconds after advanced throttle, sixty second delay 332 will issue a true to OR gate 326 through conductor 334 which will be passed to set latch 314 through conductor 328.

Assuming the normal take off, landing gear switch 46 will open thus issuing a false input to AND gate 296 through conductor $54b_2$ and the AND gate 298 through conductor $54b_1$. However, the false signal issued by landing gear switch 46 passes to inverter 310 through conductor 312 which in turn issues a true signal to reset latch 314 through conductor 316 and causes the output of latch 314 to AND gate 306 through conductor 318 to return a false. The output of landing gear switch is received by AND gate 306. If the aircraft is in flight a false signal is received and successive flight transfer is blocked. Automatic transfer inhibit 158 will issue a true signal to inverter 320 through conductor 244 when the automatic transfer inhibit has been activated. A true signal to inverter 320 will be passed to AND gate 306 as a false signal, preventing a true output by AND gate 306. Thus while automatic transfer inhibit is issuing a true signal no landing gear switch transfer will take place.

Figure 11:
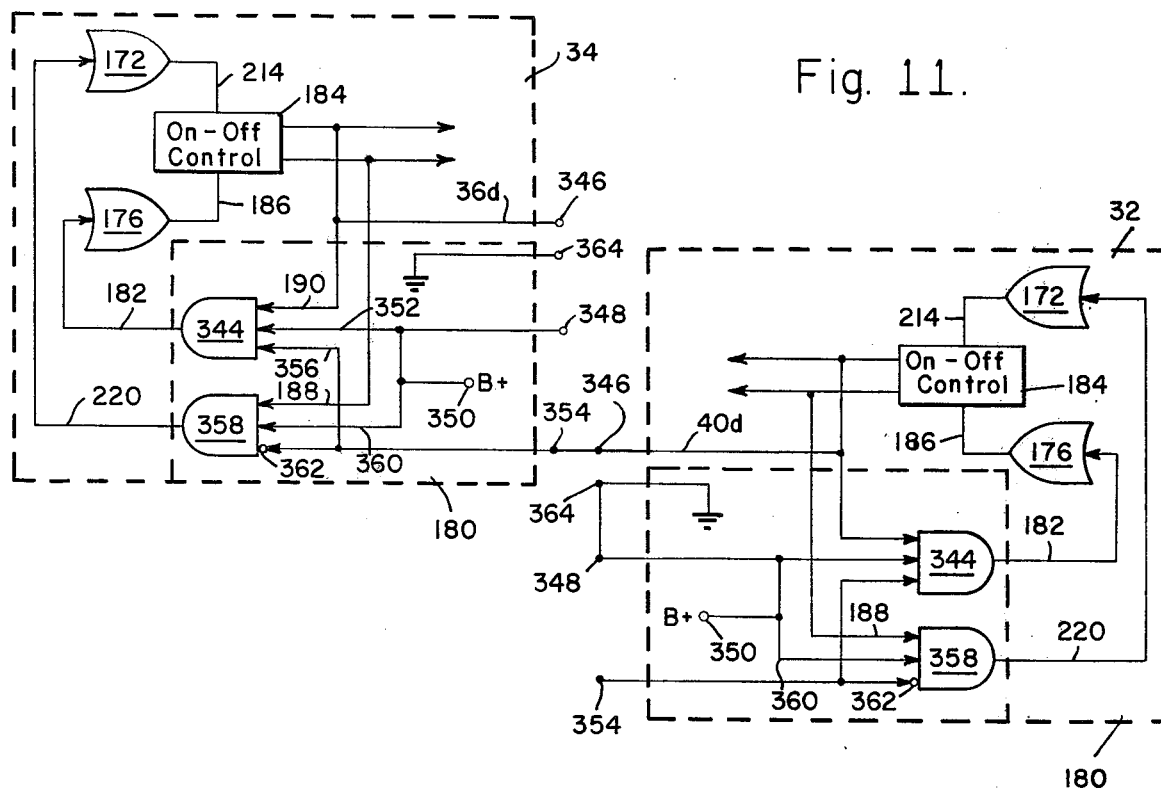
FIG. 11 is a logic diagram of an on-off control interconnect showing the interconnect logic for the system of FIG. 8.

Referring now to FIG. 11, the interconnect logic 180 of automatic transfer circuit 34 and automatic transfer circuit 32 are shown in detail along with their interconnections. Since the internal connections of interconnect logic 180 of automatic transfer circuit 34 and the interconnect logic of automatic transfer circuit 32 are identical, the connections of interconnect logic 180 of automatic transfer circuit 34 only will be described.

The input side of AND gate 344 is connected to on-off control 184 through conductor 190 which is in turn connected to terminal 346 through conductor 36d; it is also connected to terminal 348 and terminal 350 through conductor 352, and to terminal 354 through conductor 356. The output side of AND gate 344 is connected to OR gate 176 through conductor 182.

The input side of AND gate 358 is connected to on-off control 184 through conductor 188, to terminal 348 and terminal 350 through conductor 360 and through inverter 362 to terminal 354. Terminal 354 of automatic transfer circuit 34 is connected to terminal 346 of automatic transfer circuit 32. The remaining external terminals of the interconnect logic 180 of automatic transfer circuit 34 are unconnected. Terminal 348 and terminal 364 of the interconnect logic 180 of automatic transfer circuit 32 are connected to each other.

If automatic cabin pressure controller 16 and automatic cabin pressure controller 17 are either both on or both off, the interconnect logic 180 will operate on automatic cabin pressure controller 17 through interconnect logic 180 of automatic transfer circuit 34 to turn controller 17 on if both controllers were off or to turn controller 17 off if both controllers were on. Change in status of controller 16 is prevented by the disabling connection between terminal 348 and terminal 364 of automatic transfer circuit 32. By connecting terminal 348 to terminal 364, a false signal is input to AND gate 344 and AND gate 358 of interconnect logic of automatic transfer circuit 32. Since each of the AND gates of interconnect logic of automatic transfer circuit 32 will constantly have a false input, they will never have a true or operative output and further discussion of their operation is unnecessary.

When automatic cabin pressure controller 17 is on, on-off control 184 issues a true signal which passes to AND gate 344 through conductor 190. If automatic cabin pressure controller 6 is simultaneously on, on-off control of automatic transfer circuit 32 will issue a true signal which will pass through terminal 346 of the interconnect logic of automatic transfer circuit 32 to terminal 354 of interconnect logic 180 of automatic transfer circuit 34. This true signal will pass to inverter 362 and be input into AND gate 358 as a false and to AND gate 344 through conductor 356 as a true signal. The third input to AND gate 344 will be from terminal 350 or the power supply which will be a constant true input. Three true inputs at AND gate 344 will result in a true output to OR gate 176 through conductor 182 and will turn automatic cabin pressure controller 17 off as described in connection with FIG. 9.

If automatic cabin pressure controller 17 is off, on-off control 184 will issue a true signal to AND gate 358 through conductor 188. If automatic cabin pressure controller 16 is off, on-off control of automatic transfer circuit 32 will be issuing a false signal to terminal 346. This false signal will then pass to terminal 354 of interconnect logic 180 of automatic transfer circuit 34 and pass to inverter 362 which in turn will issue a true signal to AND gate 358. The false signal at terminal 354 is also passed to AND gate 344 through conductor 356 which will keep the output at AND gate 344 false. The third input to AND gate 358 is from terminal 350 which is a constant true signal through conductor 360. The three true inputs to AND gate 358 will result in a true output to OR gate 172 through conductor 220. A true signal at the input to OR gate 172 will turn automatic cabin pressure controller 17 on as described in connection with FIG. 8.

The purpose of having identical interconnect logics in automatic transfer circuits 32 and 34 is to retain the complete interchangeability of the two units. Providing external terminals allows the disabling of one interconnect logic while the other remains completely functional.

Specific embodiments of an aircraft cabin pressure control system have been shown, illustrating and describing the use of dual automatic controllers, a method for alternating their use in an aircraft, a method for achieving a linear rate of change of cabin pressure, a way of identifying the defective controller when it malfunctions, a method for determining whether an unexpected result was due to a controller malfunction, methods for preventing both controllers from being in the same state, a method for detecting undesirable rate changes in cabin pressure, and a method for preventing disasters due to the differential between cabin pressure and outside ambient pressure. It is to be understood that the foregoing embodiments are presented by way of example only and that the invention is not to be construed as being limited thereto, but only by the proper scope of the following claims.

We claim:

1. A system for controlling pressurization of an aircraft cabin from a source of pressurized air during successive flights of an aircraft, said system comprising:
    two cabin pressure controllers for controlling pressurization by said source;
    means for selectively connecting one of said controllers as primary controller for controlling cabin pressure during one flight of the aircraft;
    means for connecting the other of said controllers as primary controller for controlling cabin pressure during a successive flight of the aircraft; and
    annunciating means operably associated with each of said controllers for annunciating the identity of the primary controller.

2. A cabin pressure control system as in claim 1 wherein the controller not controlling cabin pressure is designated the standby controller and including:
    transfer means for monitoring performance of the primary controller and, upon malfunction, disconnecting the primary controller and connecting the standby controller for controlling cabin pressure; and
    means for preventing change of condition of said annunciating means upon change of controllers by said transfer means.

3. A cabin pressure control system as in claim 2 including:
    means for reconnecting said primary control means and disconnecting said standby means for change of controllers by said transfer means.

4. A method for controlling cabin pressure in an aircraft including a source of pressurized air and two cabin pressure controller means, said method comprising the steps of:
connecting one of said controller means as primary to control pressurization of said cabin from said source;
producing a sensory detectable response to identify said one controller means as primary;
connecting the other of said controller means as standby to monitor the performance of said primary controller means;
connecting said standby controller means to control cabin pressure and disconnecting said primary controller means from cabin pressure control upon malfunction of said primary controller means; and
preventing change of designation of said one controller means as primary upon occurrence of said malfunction.

5. A system for controlling cabin pressure in an aircraft, said system comprising:
two controller means, a first designated primary and in control of cabin pressure, the second designated standby and monitoring performance of the primary controller means;
successive flight transfer means to alternate said two controller means between said primary and said standby designations;
first detecting means responsive to said first controller designated primary;
second detecting means responsive to said second controller designated primary on a successive flight;
first annunciating means for producing a sensory detectable change responsive to said first detecting means; and
second annunciating means for producing a sensory detectable change responsive to said second detecting means.

* * * * *